(12) United States Patent
Adib et al.

(10) Patent No.: US 11,167,532 B2
(45) Date of Patent: Nov. 9, 2021

(54) ARTICLES AND METHODS FOR BONDING SHEETS WITH CARRIERS

(71) Applicant: CORNING INCORPORATED, Corning, NY (US)

(72) Inventors: Kaveh Adib, Corning, NY (US); Robert Alan Bellman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 435 days.

(21) Appl. No.: 15/574,560

(22) PCT Filed: May 17, 2016

(86) PCT No.: PCT/US2016/032843
§ 371 (c)(1),
(2) Date: Nov. 16, 2017

(87) PCT Pub. No.: WO2016/187186
PCT Pub. Date: Nov. 24, 2016

(65) Prior Publication Data
US 2018/0126705 A1     May 10, 2018

Related U.S. Application Data

(60) Provisional application No. 62/201,245, filed on Aug. 5, 2015, provisional application No. 62/163,821, filed on May 19, 2015.

(51) Int. Cl.
*B32B 17/10*     (2006.01)
*B32B 7/06*     (2019.01)
(Continued)

(52) U.S. Cl.
CPC .......... *B32B 17/10798* (2013.01); *B32B 7/06* (2013.01); *B32B 17/06* (2013.01);
(Continued)

(58) Field of Classification Search
CPC .............. B32B 17/10798; B32B 17/06; B32B 17/10036; B32B 7/06; B32B 37/1018;
(Continued)

(56) References Cited

U.S. PATENT DOCUMENTS 3,722,181 A    3/1973   Kirkland
4,096,315 A    6/1978   Kubacki
(Continued)

FOREIGN PATENT DOCUMENTS

CN     101924067 A     12/2010
CN     102034746 A     4/2011
(Continued)

OTHER PUBLICATIONS

Lubguban, Jr. et al; "Low-K Organosilicate Films Prepared by Tetravinyltetramethylcyclotetrasiloxane", J. of Applied Physics, V92, N2, p. 1033-1038, 2002.
(Continued)

*Primary Examiner* — Ruiyun Zhang

(57) ABSTRACT

Described herein are organosilicon modification layers and associated deposition methods and inert gas treatments that may be applied on a sheet, a carrier, or both, to control van der Waals, hydrogen and covalent bonding between a sheet and carrier. The modification layers bond the sheet and carrier together such that a permanent bond is prevented at high temperature processing as well as maintaining a sufficient bond to prevent delamination during high temperature processing.

48 Claims, 9 Drawing Sheets

(51) Int. Cl.
*C03C 17/30* (2006.01)
*C03C 27/10* (2006.01)
*B32B 17/06* (2006.01)
*B32B 37/10* (2006.01)

(52) U.S. Cl.
CPC .... *B32B 17/10036* (2013.01); *B32B 37/1018* (2013.01); *C03C 17/30* (2013.01); *C03C 27/10* (2013.01); *B32B 2307/714* (2013.01); *B32B 2307/748* (2013.01); *B32B 2457/206* (2013.01); *C03C 2218/33* (2013.01)

(58) Field of Classification Search
CPC ........ B32B 2307/714; B32B 2307/748; B32B 2457/206; C03C 17/30; C03C 27/10
USPC .................... 428/1.5, 1.52, 145, 149; 156/99
See application file for complete search history.

(56) References Cited

U.S. PATENT DOCUMENTS

| | | |
|---|---|---|
| 4,179,324 A | 12/1979 | Kirkpatrick |
| 4,397,722 A | 8/1983 | Haller |
| 4,599,243 A | 7/1986 | Sachdev et al. |
| 4,810,326 A | 3/1989 | Babu et al. |
| 4,822,466 A | 4/1989 | Rabalais et al. |
| 4,849,284 A | 7/1989 | Arthur et al. |
| 4,990,462 A | 2/1991 | Sliwa, Jr. |
| 5,073,181 A | 12/1991 | Foster et al. |
| 5,141,800 A | 8/1992 | Effenberger et al. |
| 5,222,494 A | 6/1993 | Baker, Jr. |
| 5,357,726 A | 10/1994 | Effenberger et al. |
| 5,413,940 A | 5/1995 | Lin et al. |
| 5,462,781 A | 10/1995 | Zukowski |
| 5,479,043 A | 12/1995 | Nuyen |
| 5,482,896 A | 1/1996 | Tang |
| 5,491,571 A | 2/1996 | Williams et al. |
| 5,554,680 A | 9/1996 | Ojakaar |
| 5,616,179 A | 4/1997 | Baldwin et al. |
| 5,661,618 A | 8/1997 | Brown et al. |
| 5,718,967 A | 2/1998 | Hu et al. |
| 5,755,867 A | 5/1998 | Chikuni et al. |
| 5,820,991 A | 10/1998 | Cabo |
| 5,840,616 A | 11/1998 | Sakaguchi et al. |
| 5,888,591 A | 3/1999 | Gleason et al. |
| 5,904,791 A | 5/1999 | Bearinger et al. |
| 5,966,622 A | 10/1999 | Levine et al. |
| 5,972,152 A | 10/1999 | Lake et al. |
| 6,037,026 A | 3/2000 | Iwamoto |
| 6,091,478 A | 7/2000 | Tanaka et al. |
| 6,124,154 A | 9/2000 | Miyasaka |
| 6,159,385 A | 12/2000 | Yao et al. |
| 6,261,398 B1 | 7/2001 | Costa |
| 6,338,901 B1 | 1/2002 | Veerasamy |
| 6,379,746 B1 | 4/2002 | Birch et al. |
| 6,387,736 B1 | 5/2002 | Cao et al. |
| 6,521,511 B1 | 2/2003 | Inoue et al. |
| 6,521,857 B1 | 2/2003 | Barnett |
| 6,528,145 B1 | 3/2003 | Berger et al. |
| 6,540,866 B1 | 4/2003 | Zhang et al. |
| 6,602,606 B1 | 8/2003 | Fujisawa et al. |
| 6,645,828 B1 | 11/2003 | Farrens et al. |
| 6,649,540 B2 | 11/2003 | Wang et al. |
| 6,687,969 B1 | 2/2004 | Dando |
| 6,699,798 B2 | 3/2004 | Rockford |
| 6,735,982 B2 | 5/2004 | Matthies |
| 6,762,074 B1 | 7/2004 | Draney et al. |
| 6,814,833 B2 | 11/2004 | Sabia |
| 6,815,070 B1 | 11/2004 | Burkle et al. |
| 6,969,166 B2 | 11/2005 | Clark et al. |
| 6,974,731 B2 | 12/2005 | Yamazaki et al. |
| 6,992,371 B2 | 1/2006 | Mancini et al. |
| 7,041,608 B2 | 5/2006 | Sieber et al. |
| 7,045,878 B2 | 5/2006 | Faris |
| 7,056,751 B2 | 6/2006 | Faris |
| 7,060,323 B2 | 6/2006 | Sugahara et al. |
| 7,118,990 B1 | 10/2006 | Xu et al. |
| 7,129,311 B2 | 10/2006 | Teff et al. |
| 7,144,638 B2 | 12/2006 | Leung et al. |
| 7,147,740 B2 | 12/2006 | Takayama et al. |
| 7,166,520 B1 | 1/2007 | Henley |
| 7,220,656 B2 | 5/2007 | Forbes |
| 7,232,739 B2 | 6/2007 | Kerdiles et al. |
| 7,261,793 B2 | 8/2007 | Chen et al. |
| 7,351,300 B2 | 4/2008 | Takayama et al. |
| 7,364,942 B2 | 4/2008 | Martin |
| 7,407,867 B2 | 8/2008 | Ghyselen et al. |
| 7,408,006 B2 | 8/2008 | Comino et al. |
| 7,466,390 B2 | 12/2008 | French et al. |
| 7,482,249 B2 | 1/2009 | Jakob et al. |
| 7,531,590 B2 | 5/2009 | Teff et al. |
| 7,541,264 B2 | 6/2009 | Gardner et al. |
| 7,574,787 B2 | 8/2009 | Xu et al. |
| 7,575,983 B2 | 8/2009 | Hu et al. |
| 7,635,617 B2 | 12/2009 | Yamazaki |
| 7,642,559 B2 | 1/2010 | Yamazaki et al. |
| 7,737,035 B1 | 6/2010 | Lind et al. |
| 7,741,775 B2 | 6/2010 | Yamazaki et al. |
| 7,749,862 B2 | 7/2010 | Schwarzenbach et al. |
| 7,763,365 B2 | 7/2010 | Takeuchi et al. |
| 7,842,548 B2 | 11/2010 | Lee et al. |
| 7,902,038 B2 | 3/2011 | Aspar et al. |
| 7,909,928 B2 | 3/2011 | Lahann et al. |
| 7,939,425 B2 | 5/2011 | Hu et al. |
| 7,960,840 B2 | 6/2011 | Bonifield et al. |
| 7,960,916 B2 | 6/2011 | Kawachi |
| 7,978,282 B2 | 7/2011 | An et al. |
| 7,989,314 B2 | 8/2011 | Lee et al. |
| 8,012,667 B2 | 9/2011 | Nam et al. |
| 8,034,206 B2 | 10/2011 | Kim et al. |
| 8,034,452 B2 | 10/2011 | Padiyath et al. |
| 8,043,697 B2 | 10/2011 | Murakami et al. |
| 8,048,794 B2 | 11/2011 | Knickerbocker |
| 8,069,229 B2 | 11/2011 | Yellapragada et al. |
| 8,105,935 B2 | 1/2012 | Ohara et al. |
| 8,138,614 B2 | 3/2012 | Yamazaki et al. |
| 8,173,249 B2 | 5/2012 | Leu et al. |
| 8,211,259 B2 | 7/2012 | Sato et al. |
| 8,211,270 B2 | 7/2012 | Suzuki et al. |
| 8,236,669 B2 | 8/2012 | Hong et al. |
| 8,268,939 B2 | 9/2012 | Ebbrecht et al. |
| 8,349,727 B2 | 1/2013 | Guo et al. |
| 8,383,460 B1 | 2/2013 | Yim |
| 8,399,047 B2 | 3/2013 | Lahann et al. |
| 8,580,069 B2 | 11/2013 | Watanabe et al. |
| 8,590,688 B2 | 11/2013 | Weigl |
| 8,609,229 B2 | 12/2013 | Kondo |
| 8,656,735 B2 | 2/2014 | Tamitsuji et al. |
| 8,660,052 B2 | 2/2014 | Liang et al. |
| 8,697,228 B2 | 4/2014 | Carre et al. |
| 8,697,728 B2 | 4/2014 | Ashrafian et al. |
| 8,822,306 B2 | 9/2014 | Berger et al. |
| 8,840,999 B2 | 9/2014 | Harimoto et al. |
| 8,993,706 B2 | 3/2015 | Schubert et al. |
| 8,995,146 B2 | 3/2015 | Brooks et al. |
| 9,069,133 B2 | 6/2015 | Baldwin et al. |
| 9,111,981 B2 | 8/2015 | Flaim et al. |
| 9,131,587 B2 | 9/2015 | Zhou |
| 9,269,826 B2 | 2/2016 | Hosono et al. |
| 9,612,455 B2 | 4/2017 | Nicolson et al. |
| 9,805,941 B2 | 10/2017 | Kanarik et al. |
| 9,889,635 B2 | 2/2018 | Bellman et al. |
| 10,046,542 B2 | 8/2018 | Adib et al. |
| 10,086,584 B2 | 10/2018 | Bellman et al. |
| 10,543,662 B2 | 1/2020 | Bellman et al. |
| 2001/0045351 A1 | 11/2001 | Koh et al. |
| 2002/0171080 A1 | 11/2002 | Faris |
| 2003/0017303 A1 | 1/2003 | Shindo et al. |
| 2003/0020049 A1 | 1/2003 | Payne et al. |
| 2003/0020062 A1 | 1/2003 | Faris |
| 2003/0057563 A1 | 3/2003 | Nathan et al. |
| 2003/0119336 A1 | 6/2003 | Matsuki et al. |
| 2003/0175525 A1 | 9/2003 | Wochnowski et al. |
| 2003/0210853 A1 | 11/2003 | Kato |

(56) References Cited

U.S. PATENT DOCUMENTS

| | | |
|---|---|---|
| 2003/0228413 A1 | 12/2003 | Ohta et al. |
| 2004/0033358 A1 | 2/2004 | Coates et al. |
| 2004/0044100 A1 | 3/2004 | Schlenoff et al. |
| 2004/0217352 A1 | 11/2004 | Forbes |
| 2004/0222500 A1 | 11/2004 | Aspar et al. |
| 2004/0247949 A1 | 12/2004 | Akedo et al. |
| 2004/0248378 A1 | 12/2004 | Ghyselen et al. |
| 2004/0258850 A1 | 12/2004 | Straccia et al. |
| 2005/0001201 A1 | 1/2005 | Bocko et al. |
| 2005/0029224 A1 | 2/2005 | Aspar et al. |
| 2005/0059218 A1 | 3/2005 | Faris |
| 2005/0069713 A1 | 3/2005 | Gupta et al. |
| 2005/0081993 A1 | 4/2005 | Ilkka et al. |
| 2005/0118595 A1 | 6/2005 | Lahann |
| 2005/0118742 A1 | 6/2005 | Henning et al. |
| 2005/0136188 A1 | 6/2005 | Chang |
| 2005/0175851 A1 | 8/2005 | Bordunov et al. |
| 2005/0224155 A1 | 10/2005 | Chen et al. |
| 2005/0242341 A1 | 11/2005 | Knudson et al. |
| 2006/0091104 A1 | 5/2006 | Takeshita et al. |
| 2006/0134362 A1 | 6/2006 | Lu et al. |
| 2006/0165975 A1 | 7/2006 | Moser et al. |
| 2006/0166464 A1 | 7/2006 | Jakob et al. |
| 2006/0192205 A1 | 8/2006 | Yamazaki et al. |
| 2006/0246218 A1 | 11/2006 | Bienkiewicz et al. |
| 2006/0250559 A1 | 11/2006 | Bocko et al. |
| 2006/0264004 A1 | 11/2006 | Tong et al. |
| 2007/0048530 A1 | 3/2007 | Tsao et al. |
| 2007/0077353 A1 | 4/2007 | Lee et al. |
| 2007/0077728 A1 | 4/2007 | Kulkarni et al. |
| 2007/0077782 A1 | 4/2007 | Lee et al. |
| 2007/0091062 A1 | 4/2007 | French et al. |
| 2007/0105252 A1 | 5/2007 | Lee et al. |
| 2007/0105339 A1 | 5/2007 | Faris |
| 2007/0111391 A1 | 5/2007 | Aoki et al. |
| 2007/0134784 A1 | 6/2007 | Halverson et al. |
| 2007/0181938 A1 | 8/2007 | Bucher et al. |
| 2007/0248809 A1 | 10/2007 | Haldeman et al. |
| 2008/0044588 A1 | 2/2008 | Sakhrani |
| 2008/0053959 A1 | 3/2008 | Tong et al. |
| 2008/0090380 A1 | 4/2008 | Gardner et al. |
| 2008/0111786 A1 | 5/2008 | Goudarzi |
| 2008/0135175 A1 | 6/2008 | Higuchi |
| 2008/0173992 A1 | 7/2008 | Mahler et al. |
| 2008/0212000 A1 | 9/2008 | French et al. |
| 2008/0309867 A1 | 12/2008 | Kampstra |
| 2009/0020414 A1 | 1/2009 | Tsao et al. |
| 2009/0091025 A1 | 4/2009 | Wong et al. |
| 2009/0110882 A1 | 4/2009 | Higuchi |
| 2009/0126404 A1 | 5/2009 | Sakhrani et al. |
| 2009/0133820 A1 | 5/2009 | Sato et al. |
| 2009/0218560 A1 | 9/2009 | Flaim et al. |
| 2009/0227074 A1 | 9/2009 | Hong et al. |
| 2009/0261062 A1 | 10/2009 | Kim |
| 2009/0262294 A9 | 10/2009 | Templier et al. |
| 2009/0266471 A1 | 10/2009 | Kim et al. |
| 2009/0321005 A1 | 12/2009 | Higuchi et al. |
| 2010/0018505 A1 | 1/2010 | Ma et al. |
| 2010/0038023 A1 | 2/2010 | Kho et al. |
| 2010/0089096 A1 | 4/2010 | Tamitsuji et al. |
| 2010/0101719 A1 | 4/2010 | Otsuka et al. |
| 2010/0151231 A1 | 6/2010 | Matsuo et al. |
| 2010/0187980 A1 | 7/2010 | Langer et al. |
| 2010/0224320 A1 | 9/2010 | Tsai et al. |
| 2010/0308014 A1 | 12/2010 | Cheshire |
| 2010/0316871 A1 | 12/2010 | Fujiwara et al. |
| 2011/0001251 A1 | 1/2011 | Gou et al. |
| 2011/0002636 A1 | 1/2011 | Ando et al. |
| 2011/0010905 A1 | 1/2011 | Sturzebecher |
| 2011/0012873 A1 | 1/2011 | Prest et al. |
| 2011/0024166 A1 | 2/2011 | Chang et al. |
| 2011/0026236 A1 | 2/2011 | Kondo et al. |
| 2011/0042649 A1 | 2/2011 | Duvall et al. |
| 2011/0045239 A1 | 2/2011 | Takaya et al. |
| 2011/0048611 A1 | 3/2011 | Carre et al. |
| 2011/0064953 A1 | 3/2011 | O'Rourke et al. |
| 2011/0069467 A1 | 3/2011 | Flaim et al. |
| 2011/0092006 A1 | 4/2011 | An et al. |
| 2011/0102346 A1 | 5/2011 | Orsley et al. |
| 2011/0111194 A1 | 5/2011 | Carre et al. |
| 2011/0123787 A1 | 5/2011 | Tomamoto et al. |
| 2011/0170991 A1 | 7/2011 | Weigl |
| 2011/0207328 A1 | 8/2011 | Speakman |
| 2011/0227086 A1 | 9/2011 | French |
| 2011/0250427 A1 | 10/2011 | Kotov et al. |
| 2011/0256385 A1 | 10/2011 | Matsuzaki et al. |
| 2011/0272090 A1 | 11/2011 | Higuchi |
| 2011/0304794 A1 | 12/2011 | Noh et al. |
| 2011/0308739 A1 | 12/2011 | McCutcheon et al. |
| 2011/0311789 A1 | 12/2011 | Loy et al. |
| 2011/0318544 A1 | 12/2011 | Chen et al. |
| 2011/0318589 A1 | 12/2011 | Pignatelli et al. |
| 2012/0009703 A1 | 1/2012 | Feinstein et al. |
| 2012/0034437 A1 | 2/2012 | Puligadda et al. |
| 2012/0035309 A1 | 2/2012 | Zhu et al. |
| 2012/0045611 A1 | 2/2012 | Shih et al. |
| 2012/0052654 A1 | 3/2012 | Yang et al. |
| 2012/0061881 A1 | 3/2012 | Bae et al. |
| 2012/0063952 A1 | 3/2012 | Hong et al. |
| 2012/0080403 A1 | 4/2012 | Tomamoto et al. |
| 2012/0083098 A1 | 4/2012 | Berger et al. |
| 2012/0107978 A1 | 5/2012 | Shin et al. |
| 2012/0118478 A1 | 5/2012 | Park et al. |
| 2012/0132885 A1 | 5/2012 | Lippert et al. |
| 2012/0135187 A1 | 5/2012 | Takimoto et al. |
| 2012/0153496 A1 | 6/2012 | Lee et al. |
| 2012/0156457 A1 | 6/2012 | Kondo |
| 2012/0156480 A1 | 6/2012 | Kondo et al. |
| 2012/0171454 A1 | 7/2012 | Kondo et al. |
| 2012/0193029 A1 | 8/2012 | Fay et al. |
| 2012/0202010 A1 | 8/2012 | Uchida |
| 2012/0202030 A1 | 8/2012 | Kondo et al. |
| 2012/0223049 A1 | 9/2012 | Yoshikawa et al. |
| 2012/0228617 A1 | 9/2012 | Ko et al. |
| 2012/0235315 A1 | 9/2012 | Wu et al. |
| 2012/0258320 A1 | 10/2012 | Berger |
| 2012/0272800 A1 | 11/2012 | Lacan et al. |
| 2012/0276689 A1 | 11/2012 | Canale et al. |
| 2012/0315470 A1 | 12/2012 | Hanaki et al. |
| 2012/0329249 A1 | 12/2012 | Ahn et al. |
| 2013/0037960 A1 | 2/2013 | Sadaka et al. |
| 2013/0115441 A1 | 5/2013 | Bookbinder et al. |
| 2013/0188324 A1 | 7/2013 | Lee et al. |
| 2013/0192574 A1 | 8/2013 | Dukkipati et al. |
| 2013/0192754 A1 | 8/2013 | Dukkipati et al. |
| 2013/0203265 A1 | 8/2013 | Hsiao |
| 2013/0209731 A1 | 8/2013 | Nattermann et al. |
| 2013/0230265 A1 | 9/2013 | Hubbard et al. |
| 2013/0239617 A1 | 9/2013 | Dannoux |
| 2013/0270533 A1 | 10/2013 | Crispin et al. |
| 2013/0280495 A1 | 10/2013 | Matsumoto |
| 2014/0050911 A1 | 2/2014 | Mauro et al. |
| 2014/0106141 A1 | 4/2014 | Bellman et al. |
| 2014/0106150 A1 | 4/2014 | Decker et al. |
| 2014/0130969 A1 | 5/2014 | McCutcheon et al. |
| 2014/0150244 A1 | 6/2014 | Liu et al. |
| 2014/0165654 A1 | 6/2014 | Bellman et al. |
| 2014/0166199 A1 | 6/2014 | Bellman et al. |
| 2014/0170378 A1 | 6/2014 | Bellman et al. |
| 2014/0210075 A1 | 7/2014 | Lee et al. |
| 2014/0220327 A1 | 8/2014 | Adib et al. |
| 2014/0295590 A1 | 10/2014 | Oh et al. |
| 2015/0060869 A1 | 3/2015 | Ro et al. |
| 2015/0060870 A1 | 3/2015 | Ro et al. |
| 2015/0086794 A1 | 3/2015 | Akita et al. |
| 2015/0099110 A1 | 4/2015 | Bellman et al. |
| 2015/0102498 A1 | 4/2015 | Enicks et al. |
| 2015/0266276 A1 | 9/2015 | Vissing et al. |
| 2015/0306847 A1 | 10/2015 | Bellman et al. |
| 2015/0329415 A1 | 11/2015 | Bellman et al. |
| 2016/0009958 A1 | 1/2016 | Moore et al. |
| 2016/0017196 A1 | 1/2016 | Moore et al. |
| 2016/0035764 A1 | 2/2016 | Watts |
| 2016/0083835 A1 | 3/2016 | Adib et al. |

(56) References Cited

U.S. PATENT DOCUMENTS

| | | |
|---|---|---|
| 2016/0211803 A1 | 7/2016 | Ji et al. |
| 2016/0329415 A1 | 11/2016 | He et al. |
| 2017/0036419 A1 | 2/2017 | Adib et al. |
| 2017/0182744 A1 | 6/2017 | Bellman et al. |
| 2017/0320771 A1 | 11/2017 | Adib et al. |
| 2018/0126705 A1 | 5/2018 | Adib et al. |
| 2018/0269071 A1 | 9/2018 | Le et al. |
| 2018/0297324 A1 | 10/2018 | Adib et al. |

FOREIGN PATENT DOCUMENTS

| | | |
|---|---|---|
| CN | 102070120 B | 9/2012 |
| CN | 101916022 B | 10/2012 |
| CN | 102789125 A | 11/2012 |
| CN | 102820262 A | 12/2012 |
| CN | 103042803 A | 4/2013 |
| CN | 102815052 B | 8/2016 |
| DE | 10034737 A1 | 2/2002 |
| DE | 10323303 A1 | 4/2004 |
| DE | 10323304 A1 | 4/2004 |
| DE | 10353530 A1 | 6/2005 |
| EP | 0737258 A1 | 10/1996 |
| EP | 1628339 A1 | 2/2006 |
| EP | 1914066 A1 | 4/2008 |
| EP | 2025650 A1 | 2/2009 |
| EP | 2128105 A1 | 12/2009 |
| EP | 2270865 A2 | 1/2011 |
| EP | 2273475 A1 | 1/2011 |
| EP | 2398040 A1 | 12/2011 |
| EP | 2331436 B1 | 12/2012 |
| FR | 2893750 A1 | 5/2007 |
| GB | 1082116 A | 9/1967 |
| GB | 1373359 A | 11/1974 |
| GB | 1373559 A | 11/1974 |
| GB | 1583544 A | 1/1981 |
| GB | 2481187 A | 12/2011 |
| IN | 200906585 P1 | 5/2012 |
| JP | 1993096235 A | 4/1993 |
| JP | 05-111620 A | 5/1993 |
| JP | 2000241804 A | 9/2000 |
| JP | 2002348150 A | 12/2002 |
| JP | 2003071937 A | 3/2003 |
| JP | 2003077187 A | 3/2003 |
| JP | 2004-066664 A | 3/2004 |
| JP | 2004178891 A | 6/2004 |
| JP | 2005014599 A | 1/2005 |
| JP | 2005300972 A | 10/2005 |
| JP | 2006003684 A | 1/2006 |
| JP | 2007138144 A | 6/2007 |
| JP | 4036018 B2 | 1/2008 |
| JP | 2008072087 A | 3/2008 |
| JP | 2008123948 A | 5/2008 |
| JP | 2009028922 A | 2/2009 |
| JP | 2009028923 A | 2/2009 |
| JP | 2009074002 A | 4/2009 |
| JP | 2009-131732 A | 6/2009 |
| JP | 2009184172 A | 8/2009 |
| JP | 2009283155 A | 12/2009 |
| JP | 2010018505 A | 1/2010 |
| JP | 2010167484 A | 8/2010 |
| JP | 2010-248011 A | 11/2010 |
| JP | 4625913 B2 | 2/2011 |
| JP | 2011-048979 A | 3/2011 |
| JP | 2011-058579 A | 3/2011 |
| JP | 2011-159697 A | 8/2011 |
| JP | 2011201976 A | 10/2011 |
| JP | 2011201977 A | 10/2011 |
| JP | 2011235532 A | 11/2011 |
| JP | 2011235556 A | 11/2011 |
| JP | 2011236349 A | 11/2011 |
| JP | 2011-248011 A | 12/2011 |
| JP | 2012-035532 A | 2/2012 |
| JP | 2012030424 A | 2/2012 |
| JP | 2012-119611 A | 6/2012 |
| JP | 2012-166999 A | 9/2012 |
| JP | 5057657 B2 | 10/2012 |
| JP | 2012209545 A | 10/2012 |
| JP | 2012-212939 A | 11/2012 |
| JP | 2012-227310 A | 11/2012 |
| JP | 2012-248011 A | 12/2012 |
| JP | 5111620 B2 | 1/2013 |
| JP | 2013010340 A | 1/2013 |
| JP | 2013010342 A | 1/2013 |
| JP | 2013184346 A | 9/2013 |
| JP | 2013184872 A | 9/2013 |
| JP | 2013-224475 A | 10/2013 |
| JP | 2013207084 A | 10/2013 |
| JP | 2014019597 A | 2/2014 |
| JP | 2015093405 A | 5/2015 |
| JP | 2015093795 A | 5/2015 |
| JP | 2015116694 A | 6/2015 |
| JP | 2015-209471 A | 11/2015 |
| JP | 2016-106047 A | 6/2016 |
| JP | 2017-500259 A | 1/2017 |
| JP | 2017-500753 A | 1/2017 |
| JP | 2017-087417 A | 5/2017 |
| KR | 10-2008-0096372 A | 10/2008 |
| KR | 2008113576 A | 12/2008 |
| KR | 10-2009-0114195 A | 11/2009 |
| KR | 10-2010-0051499 A | 5/2010 |
| KR | 10-2010-0057521 A | 5/2010 |
| KR | 10-2010-0112628 A | 10/2010 |
| KR | 10-1002936 B1 | 12/2010 |
| KR | 10-2011-0033284 A | 3/2011 |
| KR | 10-2011-0043376 A | 4/2011 |
| KR | 20110045136 A | 5/2011 |
| KR | 10-2011-0068352 A | 6/2011 |
| KR | 10-1073032 B1 | 10/2011 |
| KR | 10-2011-0134708 A | 12/2011 |
| KR | 10-2012-0023063 A | 3/2012 |
| KR | 10-2012-0033284 A | 4/2012 |
| KR | 2012031698 A | 4/2012 |
| KR | 10-2012-0057346 A | 6/2012 |
| KR | 10-2012-0064676 A | 6/2012 |
| KR | 10-2012-0069608 A | 6/2012 |
| KR | 20120056227 A | 6/2012 |
| KR | 10-1164945 B1 | 7/2012 |
| KR | 10-2012-0098640 A | 9/2012 |
| KR | 20120100274 A | 9/2012 |
| KR | 2013003997 A | 1/2013 |
| KR | 2013044774 A | 5/2013 |
| KR | 20130095605 A | 8/2013 |
| KR | 2013104534 A | 9/2013 |
| KR | 10-2015-0038177 A | 4/2015 |
| KR | 10-1522941 B1 | 6/2015 |
| TW | 201315593 A | 4/2013 |
| TW | 201332768 A | 8/2013 |
| TW | 201442968 A | 11/2014 |
| TW | 201545886 A | 12/2015 |
| TW | 201545887 A | 12/2015 |
| WO | 92/22604 A1 | 12/1992 |
| WO | 95/17537 A1 | 6/1995 |
| WO | 02/84722 A2 | 10/2002 |
| WO | 03/44079 A1 | 5/2003 |
| WO | 2005048669 A1 | 5/2005 |
| WO | 2006/093639 A1 | 9/2006 |
| WO | 2007/018028 A1 | 2/2007 |
| WO | 2007121524 A1 | 11/2007 |
| WO | 2008/007622 A1 | 1/2008 |
| WO | 2008044884 A1 | 4/2008 |
| WO | 2010/051106 A2 | 5/2010 |
| WO | 2010/059710 A1 | 5/2010 |
| WO | 2010079688 A1 | 7/2010 |
| WO | 2010098762 A1 | 9/2010 |
| WO | 2010/121524 A1 | 10/2010 |
| WO | 2010/128611 A1 | 11/2010 |
| WO | 2010/129459 A2 | 11/2010 |
| WO | 2011/031507 A1 | 3/2011 |
| WO | 2011/048979 A1 | 4/2011 |
| WO | 2011/104500 A1 | 9/2011 |
| WO | 2011142280 A1 | 11/2011 |
| WO | 2012/000686 A1 | 1/2012 |
| WO | 2012/057893 A2 | 5/2012 |
| WO | 2012/074952 A1 | 6/2012 |

(56) References Cited

FOREIGN PATENT DOCUMENTS

| WO | 201214499 A1 | 10/2012 |
|---|---|---|
| WO | 2013/006865 A2 | 1/2013 |
| WO | 2013044941 A1 | 4/2013 |
| WO | 2013058217 A1 | 4/2013 |
| WO | 2013119737 A2 | 8/2013 |
| WO | 2013/179881 A1 | 12/2013 |
| WO | 2014/050798 A1 | 4/2014 |
| WO | 2014/093193 A1 | 6/2014 |
| WO | 2014/093740 A1 | 6/2014 |
| WO | 2014/093775 A1 | 6/2014 |
| WO | 2014/093776 A1 | 6/2014 |
| WO | 2014/142280 A1 | 9/2014 |
| WO | 2014/151353 A1 | 9/2014 |
| WO | 2014163035 A1 | 10/2014 |
| WO | 2015/054098 A1 | 4/2015 |
| WO | 2015/057605 A1 | 4/2015 |
| WO | 2015/112958 A1 | 7/2015 |
| WO | 2015113020 A1 | 7/2015 |
| WO | 2015113023 A1 | 7/2015 |
| WO | 2015119210 A1 | 8/2015 |
| WO | 2015156395 A1 | 10/2015 |
| WO | 2015157202 A1 | 10/2015 |
| WO | 2015163134 A1 | 10/2015 |
| WO | 2016017645 A1 | 2/2016 |
| WO | 2016/187186 A1 | 11/2016 |
| WO | 2016209897 A1 | 12/2016 |
| WO | 2018038961 A1 | 3/2018 |

OTHER PUBLICATIONS

Nouicer et al; "Superhydrophobic Surface Produced on Polyimide and Silicon by Plasma Enhanced Chemical Vapour Deposition From Hexamethyldisiloxane Precursor"; International Journal of Nanotechnology, vol. 12, Nos. 8/9, 2015; pp. 597-607.
Rouessac et al; "Precursor Chemistry for ULK CVD", Microelectronic Engineering, V82, p. 333-340, 2005.
Groenewoud et al; "Plasma Polymerization of Thiophene Derivatives"; Langmuir, 2003, vol. 19, No. 4; pp. 1368-1374.
Lowe et al; "Plasma Polymerized P-Xylene as a Laser Fusion Target"; Surface Science, 1978, vol. 76, No. 1; pp. 242-256.
2006 Gelest Brochure on Thermal Stability of Silanes, p. 14.
2014 Gelest Brochure—Silane Coupling Agents Connecting Across Boundaries.
3M Dyneon High Temperature Perfluoroelastomer PFE 4131TZ—Technical Data 4.
Biederman; "The Properties of Films Prepared by the RF Sputtering of PTFE and Plasma Polymerization of Some Freons"; Vacuum, vol. 31, No. 7, Jan. 1, 1981, pp. 285-289.
Boscher et al; "Influence of Cyclic Organosilicon Precursors on the Corrosion of Aluminium Coated Sheet by Atmospheric Pressure Dielectric Barrier Discharge"; Surface and Coatings Technology 205; (2011) 5350-5357.
Cech et al; "Surface-Free Energy of Silicon-Based Plasma Polymer Films"; Silanes and Other Coupling Agents, vol. 5, 2009; pp. 333-348.
Chemraz® "Perfluoroelastomers—Seals That Withstand the Test of Time", Greene Tweed Medical & Biotechnology, 2000, 4 Pages.
Chiao et al; "Worldwide First Ultra-Thin LTPS-TFT LCD by a Glass on Carrier Technology"; V3, Submitted to SID 2015; 5 Pages.
Dupont Kalrez Perfluoroelastomer Parts—Physical Properties and Product Comparisons, Technical Information—Rev. 11, Sep. 2012; 4 Pages.
Girifalco et al; "A Theory for the Estimation of Surface and Interfacial Energies. I. Derivation and Application to Interfacial Tension"; Applied Science Research Lab, Cincinnati Ohio; vol. 61 (1956); pp. 904-909.
Haller; "Polymerization of Aromatic Silanes in RF Plasmas"; J. Electrochem Soc.: Solid-State Science and Technology; vol. 129, No. 1; Jan. 1982; pp. 180-183.

Haque et al; "Preparation and Properties of Plasma-Deposited Films With Surface Energies Varying Over a Wide Range"; Journal of Applied Polymer Science, vol. 32, 4369-4381 (1986).
Iller, John Wiley and Sons; "The Surface Chemistry of Silica"; Chapter 6, 1979, pp. 622-656.
Jaszewski et al; "The Deposition of Anti-Adhesive Ultra-Thin Teflon-Like Films and Their Interaction With Polymers During Hot Embossing"; Applied Surface Science, 143 (1999) 301-308.
Kuritka et al; "Mass Spectrometry Characterization of Methylphenylsilane-Hydrogen RF Plasmas"; Plasma Process. Polym. 2007, 4, 53-61.
Kuschnereit et al; "Mechanical and Elastic Properties of Amorphous Hydrogenated Silicon Films Studied by Broadband Surface Acoustic Wave Spectroscopy"; Appl. Phys. A 61, 269-276 (1995).
Maszara et al; "Bonding of Silicon Wafers for Silicon-On-Insulators"; J. Appl. Phys. 64 (10), Nov. 15, 1988; pp. 4943-4950.
Merche et al; "Atmospheric Plasmas for Thin Film Deposition: A Critical Review"; Thin Solid Films 520, (2012) 4219-4236.
Nagai et al; "Structure and Morphology of Phenylsilanes Polymer Films Synthesized by the Plasma Polymerization Method"; Journal of Material Science 33, (1998); 1897-1905.
Nehlsen et al; "Gas Permeation Properties of Plasma Polymerized Thin Film Siloxane-Type Membranes for Temperature Up to 350° C."; Journal of Membrane Science; 106 (1995) 1-7.
Oujja et al; "Multiphoton Dissociation of Phenylsilane Upon Excitation at 212.5NM"; Laser Chem., vol. 16, pp. 157-166.
Parker et al; "Surface Forces Between Plasma Polymer Films"; Langmuir 1994, 10, 276-2773.
Perlast G67P—Technical Data Sheet, Issue 4, Revision 1, Jan. 2006; 1 Page.
Salyk et al; "Plasma Polymerisation of Methylphenylsilane"; Surface & Coatings Technology, 20, (2005) pp. 486-489.
Shieh et al; "Modifications of Low Dielectric Constant Fluorinated Amorphous Carbon Films by Multiple Plasma Treatments"; J. Electro. Soc.; 149 (7) G384-G390 (2002).
Sindorf et al; "Cross-Polarization/Magic-Angle-Spinning Silicon-29 Nuclear Magnetic Resonance Study of Silica Gel Using Trimethylsilane Bonding as a Probe of Surface Geometry and Reactivity"; J. Phys. Chem. 1982, 86, 5208-85219.
Stoffels et al; "Polymerization of Fluorocarbons in Reactive Ion Etching Plasma"; Journal of Vacuum Science and Technology; Part A, AVS / AIP, Melville, NY, vol. 16, No. 1, Jan. 1, 1998, pp. 87-95.
Suratawal et al; "Surface Chemistry and Trimethylsilyl Functionalization of Stober Silica Sols"; Journal of Non-Crystalline Solids 316 (2003), pp. 349-363.
Hiltz; Techniques for the Characterization of Fluoroelastomers, Defence R&D Canada—Atlantic Technical Memorandum Dec. 2009; 52 Pages.
Terlingen et al; "Plasma Modification of Polymeric Surfaces for Biomedical Applications"; Advanced Biomaterials in Biomedical Engineering and Drug Delivery Systems, 1996; pp. 38-42.
Tillet et al; "Crosslinking of Fluoroelastomers by "Click" Azide-Nitride Cyloaddtion"; Journal of Polymer Science, Part A: Polymer Chemistry; 2015, 53, pp. 1171-1173.
Tong et al; "Reversible Silicon Wafer Bonding for Surface Protection: Water-Enhanced Debonding"; J. Electrochem. Soc., vol. 139, No. 11, Nov. 1992, pp. L101-L102.
Trelleborg Sealing Solutions, Isolast® Perfluororelastomer Seals, Edition Nov. 2008; pp. 1-16; www.tss.trelleborg.com.
Van De Ven et al; "Deactivation With Silazanes in Chromatography, Mechanism of the Reaction and Practical Consequences in Capillary GC and RP-HPLC: A29SI CP-MAS NMR Study"; Journal of High Resolution Chromatography & Chromatography Communications; vol. 9, 1986; pp. 741-746.
Wang et al; "Dynamic Contact Angles and Contact Angle Hysteresis of Plasma Polymers"; Langmuir 1994, 10, pp. 3887-3897.
Weidman et al; "New Photodefinable Glass Etch Masks for Entirely Dry Photolithography Plasma Deposited Organosilicon Hydride Polymers"; Appl. Phys. Lett. 62 (4), Jan. 25, 1993 pp. 372-374.
Wu, "Calculation of Interfacial Tension in Polymer Systems"; J. Polymer. Sci.: Part C, No. 34, pp. 19-30 (1971).
Wu; "Polymer Interface and Adhesion"; Modifications of Polymer Surfaces, Chapter 9—Marcel Dekker; pp. 298-321.

(56) References Cited

OTHER PUBLICATIONS

Zhuravlev; "The Surface Chemistry of Amorphous Silica. Zhuravlev Model"; Colloids and Surfaces A: Physicochemical and Engineering Aspects; 173 (2000) 1-38.
Morita et al; "Applications of Plasma Polymerization"; Pure & Appl. Chem., vol. 57, No. 9 pp. 1277-1286 (1985).
ASTM International E595-07, Standard Test Method for Total Mass Loss and Collected Volatile Condensable Materials from Outgassing in a Vacuum Environment (2013).
English Translation of JP2016547990 Office Action dated Mar. 27, 2019; 3 Pages; Japanese Patent Office.
European Patent Application No. 15740126.6 Office Action dated Jul. 9, 2020; 5 Pages; European Patent Office.
Extended European Search Report and Written Opinion; 15740126.6; dated Jul. 4, 2017; 9 pages; European Patent Office.
Hair; "Hydroxyl Groups on Silica Surface", Journal of Non-Crystalline Solids; 19 (1975) 299-309, .Copyrgt. North-Holland Publishing.
International Preliminary Report on Patentability of the International Searching Authority; PCT/US15/12865; dated Aug. 11, 2016; 7 Pages; Korean Intellectual Property Office.
International Search Report and Writien Opinion of the International Searching Authority; PCT/US2016/038663; dated Sep. 23, 2016; 11 Pages; European Patent Office.
International Search Report and Writien Opinion of the International Searching Authority; PCT/US2017/049019; dated Dec. 11, 2017; 14 Pages; Korean Intellectual Property Office.
International Search Report and Writien Opinion of the International Searching Authority; PCT/US2017/049025; dated Feb. 22, 2018; 17 Pages; European Patent Office.
International Search Report and Writien Opinion of the International Searching Authority; PCT/US2018/047056; dated Dec. 7, 2018; 10 Pages; European Patent Office.
International Search Report and Written Opinion of the International Searching Aurthority; PCT/US2017/046836; dated Feb. 7, 2018; 11 Pages; Korean Intellectual Property Office.
International Search Report and Written Opinion of the International Searching Authority; PCT/US15/12865; dated May 22, 2015; 8 Pages; Korean Intellectual Property Office.
International Search Report and Written Opinion of the International Searching Authority; PCT/US2013/073785; dated Mar. 24, 2014; 11 Pages; Korean Patent Office.
International Search Report and Written Opinion of the International Searching Authority; PCT/US2013/074859; dated Mar. 25, 2014; 10 Pages; Korean Patent Office.
International Search Report and Written Opinion of the International Searching Authority; PCT/US2013/074924; dated Mar. 27, 2014; 14 pages; Korean Patent Office.
International Search Report and Written Opinion of the International Searching Authority; PCT/US2013/074926; dated Mar. 21, 2014; 13 Pages; European Patent Office.
International Search Report and Written Opinion of the International Searching Authority; PCT/US2014/059237; dated Mar. 11, 2015; 15 Pages; European Patent Office.
International Search Report and Written Opinion of the International Searching Authority; PCT/US2014/060340; dated Jan. 29, 2015; 13 Pages; European Patent Office.
International Search Report of the International Searching Authority; PCT/US2016/032843; dated Aug. 10, 2016; 14 Pages; European Patent Office.
Invitation to Pay Additional Fees From the International Searching Aurthority; PCT/US2017/049025; dated Nov. 21, 2017; 14 Pages; European Patent Office.
ISR from PCT/US2015/013012.
ISR from PCT/US2015/013017.
ISR from WO2014/151353.
ISR from WO2014/093775.
ISR from WO2015/054098.
ISR from WO2015/057605.
Mazumder et al (WO 2015-112958), Jul. 30, 2015.
McMillian et al; "Hydroxyl Sites in SiO2 Glass: A Note on Irfrared and Raman Spectra", American Mineralogist, vol. 71, pp. 772-778, 1986.
PCT—International Search Report form 220 for WO 14/093193; dated Mar. 24, 2014.
PCT—International Search Report form 220 for WO 14/093740; dated Mar. 25, 2014.
PCT—International Search Report form 220 for WO 14/093776; dated Mar. 21, 2014.
Tauc et al; "Optical Properties and Electronic Structure of Amorphous Germanium"; Phys. Stat. Sol. 15, (1966) pp. 627-637.
Worldwide First Ultra-thin LTPS-TFT LCD by A Glass on Carrier Technology, Chiao, et al., v3, submitted to SID 2015.
Taiwanese Patent Application No. 105115609, Office Action dated Apr. 23, 2021, 1 page (English Translation Only); Taiwanese Patent Office.
Sohn, et al., "Effects of plasma polymerized para-xylene intermediate layers on characteristics of flexible organic light emitting diodes fabricated on polyethylene terephthalate substrates" Journal of Alloys and Compounds, 449, 191-195, 2008. (Year: 2008).

ARTICLES AND METHODS FOR BONDING
SHEETS WITH CARRIERS

CROSS-REFERENCE TO RELATED APPLICATIONS

This application claims the benefit of priority under 35 U.S.C. § 371 of International Patent Application Serial No. PCT/US16/32843, filed on May 17, 2016, which in turn, claims the benefit of priority of U.S. Provisional Patent Application Ser. No. 62/201,245 filed on Aug. 5, 2015 and U.S. Provisional Patent Application Ser. No. 62/163,821 filed on May 19, 2015, the contents of each of which are relied upon and incorporated herein by reference in their entireties.

FIELD

The present disclosure relates generally to articles and methods for processing sheets on carriers and, more particularly, to articles and methods for processing flexible glass sheets on glass carriers.

BACKGROUND

Flexible substrates offer the promise of cheaper devices using roll-to-roll processing, and the potential to make thinner, lighter, more flexible and durable displays. However, the technology, equipment, and processes required for roll-to-roll processing of high quality displays are not yet fully developed. Since panel makers have already heavily invested in toolsets to process large sheets of glass, laminating a flexible substrate to a carrier and making display devices by sheet-to-sheet processing offers a shorter term solution to develop the value proposition of thinner, lighter, and more flexible displays. Displays have been demonstrated on polymer sheets for example polyethylene naphthalate (PEN) where the device fabrication was sheet-to-sheet with the PEN laminated to a glass carrier. The upper temperature limit of the PEN limits the device quality and process that can be used. In addition, the high permeability of the polymer substrate leads to environmental degradation of organic light emitting diode (OLED) devices where a near hermetic package is required. Thin film encapsulation offers the promise to overcome this limitation, but it has not yet been demonstrated to offer acceptable yields at large volumes.

In a similar manner, display devices can be manufactured using a glass carrier laminated to one or more thin glass substrates. It is anticipated that the low permeability and improved temperature and chemical resistance of the thin glass will enable higher performance longer lifetime flexible displays.

The concept involves bonding a thin sheet, for example, a flexible glass sheet, to a carrier initially by van der Waals forces, then increasing the bond strength in certain regions while retaining the ability to remove portions of the thin sheet after processing the thin sheet/carrier to form devices (for example, electronic or display devices, components of electronic or display devices, OLED materials, photo-voltaic (PV) structures, or thin film transistors (TFTs), thereon. At least a portion of the thin glass is bonded to a carrier such that there is prevented device process fluids from entering between the thin sheet and carrier, whereby there is reduced the chance of contaminating downstream processes, i.e., the bonded seal portion between the thin sheet and carrier is hermetic, and in some preferred embodiments, this seal encompasses the outside of the article thereby preventing liquid or gas intrusion into or out of any region of the sealed article.

In low temperature polysilicon (LTPS) device fabrication processes, for example with temperatures approaching 600° C. or greater, vacuum, and wet etch environments may be used. These conditions limit the materials that may be used, and place high demands on the carrier/thin sheet. Accordingly, what is desired is a carrier approach that utilizes the existing capital infrastructure of the manufacturers, enables processing of thin glass, i.e., glass having a thickness ≤0.3 millimeters (mm) thick, without contamination or loss of bond strength between the thin glass and carrier at higher processing temperatures, and wherein the thin glass de-bonds easily from the carrier at the end of the process.

One commercial advantage is that manufacturers will be able to utilize their existing capital investment in processing equipment while gaining the advantages of the thin glass sheets for PV, OLED, liquid crystal displays (LCDs) and patterned TFT electronics, for example. Additionally, such an approach enables process flexibility, including: processes for cleaning and surface preparation of the thin glass sheet and carrier to facilitate bonding; processes for strengthening the bond between the thin sheet and carrier at the bonded area; processes for maintaining releasability of the thin sheet from the carrier at a controllably bonded (or reduced/low-strength bond) area; and processes for cutting the thin sheets to facilitate extraction from the carrier.

In the glass-to-glass bonding process, the glass surfaces are cleaned to remove all metal, organic and particulate residues, and to leave a mostly silanol terminated surface. The glass surfaces are first brought into intimate contact, where van der Waals and/or Hydrogen-bonding forces pull them together. With heat and optionally pressure, the surface silanol groups can condense to form strong covalent Si—O—Si bonds across the interface, permanently fusing the glass pieces. Metal, organic and particulate residue will prevent bonding by obscuring the surface, thereby preventing the intimate contact required for bonding. A high silanol surface concentration is also required to form a strong bond, as the number of bonds per unit area will be determined by the probability of two silanol species on opposing surfaces reacting to condense out water. Zhuravlev has reported the average number of hydroxyls per $nm^2$ for well hydrated silica as 4.6 to 4.9. Zhuravlev, L. T., The Surface Chemistry of Amorphous Silica, Zhuravlev Model, Colloids and Surfaces A: Physiochemical Engineering Aspects 173 (2000) 1-38.

A challenge of known bonding methods is the high temperature requirement of polysilicon TFTs. The demand for higher pixel density, high resolution, and fast refresh rates on hand held displays, notebook and desktop displays, as well as the wider use of OLED displays, is pushing panel makers from amorphous silicon TFT backplanes to oxide TFT or polysilicon TFT backplanes. Because OLEDs are a current driven device, high mobility is desired. Polysilicon TFTs also offer the advantage of integration of drivers and other components activation. Higher temperature is preferred for dopant activation, ideally at temperature over 600° C. Typically, this is the highest temperature in the pSi backplane process.

Another challenge for known bonding methods is bonding to rough substrates. Wafer bonding methods with two rigid materials requires flatness and cleanliness to bring the materials into intimate contact to initiate bonding. For substrates having rough surfaces, such as etched interposers, or non-fusion drawn glass, bonding is easier with a thicker more compliant bonding layer which can elastically or plastically deform to bring the substrates into contact.

SUMMARY

In light of the above, there is a need for a thin sheet-carrier article that can withstand the rigors of TFT and flat panel display (FPD) processing, including high temperature processing (without outgassing that would be incompatible with the semiconductor or display making processes in which it will be used), yet allow the entire area of the thin sheet to be removed (either all at once, or in sections) from the carrier so as to allow the reuse of the carrier for processing another thin sheet. The present specification describes methods to control the adhesion between the carrier and thin sheet to create a temporary bond sufficiently strong to survive TFT and FPD processing (including LTPS processing) but weak enough to permit debonding of the sheet from the carrier, even after high-temperature processing. Such controlled bonding can be utilized to create an article having a reusable carrier, or alternately an article having patterned areas of controlled bonding and covalent bonding between a carrier and a sheet. More specifically, the present disclosure provides surface modification layers (including various materials and associated surface heat treatments), that may be provided on the thin sheet, the carrier, or both, to control both room-temperature van der Waals and/or hydrogen bonding, and high temperature covalent bonding, between the thin sheet and carrier. Even more specifically, the room-temperature bonding may be controlled so as to be sufficient to hold the thin sheet and carrier together during vacuum processing, wet processing, and/or ultrasonic cleaning processing. And at the same time, the high temperature covalent bonding may be controlled so as to prevent a permanent bond between the thin sheet and carrier during high temperature processing, as well as to maintain a sufficient bond to prevent delamination during high temperature processing. In alternative embodiments, the surface modification layers may be used to create various controlled bonding areas (wherein the carrier and thin sheet remain sufficiently bonded through various processes, including vacuum processing, wet processing, and/or ultrasonic cleaning processing), together with covalent bonding regions to provide for further processing options, for example, maintaining hermeticity between the carrier and sheet even after dicing the article into smaller pieces for additional device processing. Still further, some surface modification layers provide control of the bonding between the carrier and sheet while, at the same time, reduce outgassing emissions during the harsh conditions in an TFT or FPD (for example LTPS) processing environment, including high temperature and/or vacuum processing, for example.

In a first aspect, there is a glass article comprising:
a first sheet having a first sheet bonding surface;
a second sheet having a second sheet bonding surface;
a modification layer having a modification layer bonding surface, the modification layer may comprise organosilicon;
the modification layer bonding surface being in contact with the first sheet bonding surface, and the second sheet bonding surface being coupled with the first sheet bonding surface with the modification layer therebetween, wherein the first sheet bonding surface is bonded with the modification layer bonding surface with a bond energy of less than 600 mJ/m$^2$ after holding the glass article at 600° C. for 10 minutes in a nitrogen atmosphere.

In an example of aspect 1, the first sheet bonding surface is bonded with the modification layer bonding surface with a bond energy of less than 600 mJ/m$^2$ after holding the glass article at 700° C. for 10 minutes in a nitrogen atmosphere.

In another example of aspect 1, the first sheet bonding surface is bonded with the modification layer bonding surface with a bond energy of less than 600 mJ/m$^2$ after holding the glass article at 750° C. for 10 minutes in a nitrogen atmosphere.

In another example of aspect 1, the first sheet bonding surface is bonded with the modification layer bonding surface with a bond energy of less than 450 mJ/m$^2$ after holding the glass article at 650° C. for 10 minutes in a nitrogen atmosphere.

In another example of aspect 1, the modification layer has a thickness in the range of 5 nanometers (nm) to 10 microns (μm, or micrometers).

In another example of aspect 1, the modification layer has a thickness in the range of 10 nm to 500 nm.

In another example of aspect 1, the first sheet is glass having a thickness of less than 300 microns.

In another example of aspect 1, the organosilicon is formed by depositing an organosilane monomer on the first sheet bonding surface.

In a second aspect, there is provided a glass article of aspect 1, wherein the organosilane monomer has a formula $(R_1)_x Si(R_2)_y$, wherein $R_1$ is an aryl, alkyl, alkynyl and/or alkenyl and x is 1, 2 or 3, $R_2$ is hydrogen, halogen, an aryl, alkyl, alkynyl and/or alkenyl, or a combination thereof and y is 1, 2 or 3, wherein $R_1$ and $R_2$ are not oxygen.

In an example of aspect 2, $R_1$ or $R_2$ is an aryl, phenyl, tolyl, xylyl, naphthyl or a combination thereof.

In another example of aspect 2, $R_2$ is hydrogen, methyl or a combination thereof.

In another example of aspect 2, $R_1$ or $R_2$ is an aryl.

In another example of aspect 2, $R_1$ or $R_2$ is a di-aryl.

The second aspect may be provided alone or in combination with any one or more of the examples of the second aspect discussed above.

In another example of aspect 1, the organosilicon is formed by depositing an organosilane monomer on the first sheet bonding surface and the organosilane monomer is selected from the group consisting of phenylsilane, methylphenylsilane, diphenylsilane, methlydiphenylsilane and triphenylsilane.

In another example of aspect 1, the organosilicon is formed by depositing an organosilane monomer on the first sheet bonding surface and the organosilane monomer being free of an oxygen atom.

In another example of aspect 1, the modification layer is formed by deposition of a compound selected from the group consisting of phenylsilicon, methylphenylsilicon, diphenylsilicon, methlydiphenylsilicon and triphenylsilicon.

In another example of aspect 1, the modification layer is not a monolayer.

In another example of aspect 1, the modification layer is a polymerized amorphous organosilicon.

In another example of aspect 1, the second sheet is in contact with the modification layer.

In another example of aspect 1, the modification layer has an atomic percent ratio of oxygen to silicon of less than 0.9, wherein the atomic percent of silicon and oxygen is measured from the modification layer prior to surface modification and being in contact with the first sheet bonding surface.

In another example of aspect 1, the modification layer has an atomic percent ratio of oxygen to silicon of less than 0.8, wherein the atomic percent of silicon and oxygen is measured from the modification layer prior to surface modification and being in contact with the first sheet bonding surface.

In another example of aspect 1, the modification layer bonding surface has an atomic percent ratio of oxygen to silicon in the range of 1 to 3 and an atomic percent ratio of nitrogen to silicon in the range of 0.5 to 1.5, wherein the atomic percent of silicon, oxygen and nitrogen is measured from the modification layer bonding surface after the modification layer bonding surface is exposed to nitrogen containing reactant to increase the surface energy of the modification layer bonding surface to a range of 55 to 75 mJ/m².

In another example of aspect 1, the modification layer bonding surface has an atomic percent ratio of oxygen to silicon of less than 2.5, wherein the atomic percent of silicon and oxygen is measured from the modification layer bonding surface after the modification layer bonding surface is exposed to nitrogen containing reactant to increase the surface energy of the modification layer bonding surface to a range of 55 to 75 mJ/m².

In another example of aspect 1, the modification layer bonding surface has an atomic percent ratio of oxygen to silicon in the range of 1 to 3 and an atomic percent ratio of nitrogen to silicon in the range of 2.5 to 6.5, wherein the atomic percent of silicon, oxygen and nitrogen is measured from the modification layer bonding surface after the glass article is held at 700° C. for 10 minutes in nitrogen containing reactant and then the first sheet is separated from the second sheet after the glass article is cooled to room temperature.

In another example of aspect 1, the modification layer bonding surface has an atomic percent ratio of oxygen to silicon of less than 2.6, wherein the atomic percent of silicon and oxygen is measured from the modification layer bonding surface after the glass article is held at 700° C. for 10 minutes in nitrogen containing reactant and then the first sheet is separated from the second sheet after the glass article is cooled to room temperature.

In another example of aspect 1, the change in percent of blister area is less than 5 percent after the glass article is subjected to a temperature cycle by heating in a chamber cycled from room temperature to 600° C. at a rate of 600° C. per minute and held at 600° C. for 10 minutes before allowing the glass article to cool to room temperature.

In another example of aspect 1, the change in percent of blister area is less than 1 percent after the glass article is subjected to a temperature cycle by heating in a chamber cycled from room temperature to 700° C. at a rate of 600° C. per minute and held at 700° C. for 10 minutes before allowing the glass article to cool to room temperature.

In another example of aspect 1, the first sheet may be separated from the second sheet without breaking the first sheet into two or more pieces after the glass article is subjected to a temperature cycle by heating in a chamber cycled from room temperature to 700° C. at a rate of 600° C. per minute and held at 700° C. for 10 minutes before allowing the glass article to cool to room temperature.

In another example of aspect 1, there is no outgassing from the modification layer in the temperature range of 300 to 650° C.

The first aspect may be provided alone or in combination with any one or more of the examples of the first aspect discussed above.

In a third aspect, there is a glass article comprising:
a first sheet having a first sheet bonding surface;
a second sheet having a second sheet bonding surface;
a modification layer having a modification layer bonding surface, the modification layer comprising organosilicon and the modification layer not being a monolayer;
the modification layer bonding surface being in contact with the first sheet bonding surface, and the second sheet bonding surface being coupled with the first sheet bonding surface with the modification layer therebetween, wherein the first sheet bonding surface is bonded with the modification layer bonding surface with a bond energy within the range of 150 to 600 mJ/m² over a temperature range of 400 to 600° C., where bond energy at any particular temperature in the range is measured by holding the glass article at that particular temperature for 10 minutes in a nitrogen atmosphere.

In an example of aspect 3, the first sheet bonding surface is bonded with the modification layer bonding surface with a bond energy within the range of 300 to 400 mJ/m² over a temperature range of 400 to 600° C., where bond energy at any particular temperature in the range is measured by holding the glass article at that particular temperature for 10 minutes in a nitrogen atmosphere.

In another example of aspect 3, the first sheet bonding surface is bonded with the modification layer bonding surface with a bond energy within the range of 350 to 400 mJ/m² over a temperature range of 400 to 600° C., where bond energy at any particular temperature in the range is measured by holding the glass article at that particular temperature for 10 minutes in a nitrogen atmosphere.

In another example of aspect 3, the first sheet bonding surface is bonded with the modification layer bonding surface with a bond energy within the range of 300 to 400 mJ/m² over a temperature range of 500 to 600° C., where bond energy at any particular temperature in the range is measured by holding the glass article at that particular temperature for 10 minutes in a nitrogen atmosphere.

In another example of aspect 3, the first sheet bonding surface is bonded with the modification layer bonding surface with a bond energy within the range of 500 to 600 mJ/m² over a temperature range of 500 to 600° C., where bond energy at any particular temperature in the range is measured by holding the glass article at that particular temperature for 10 minutes in a nitrogen atmosphere.

In another example of aspect 3, the first sheet bonding surface is bonded with the modification layer bonding surface with a bond energy within the range of 400 to 600 mJ/m² over a temperature range of 450 to 750° C., where bond energy at any particular temperature in the range is measured by holding the glass article at that particular temperature for 10 minutes in a nitrogen atmosphere.

In another example of aspect 3, the first sheet bonding surface is bonded with the modification layer bonding surface with a bond energy within the range of 300 to 400 mJ/m² over a temperature range of 550 to 650° C., where bond energy at any particular temperature in the range is measured by holding the glass article at that particular temperature for 10 minutes in a nitrogen atmosphere.

In another example of aspect 3, the change in percent of blister area is less than 5 percent after the glass article is subjected to a temperature cycle by heating in a chamber cycled from room temperature to 600° C. at a rate of 600° C. per minute and held at 600° C. for 10 minutes before allowing the glass article to cool to room temperature.

In another example of aspect 3, the change in percent of blister area is less than 1 percent after the glass article is subjected to a temperature cycle by heating in a chamber cycled from room temperature to 700° C. at a rate of 600°

C. per minute and held at 700° C. for 10 minutes before allowing the glass article to cool to room temperature.

The third aspect may be provided alone or in combination with any one or more of the examples of the third aspect discussed above.

In a fourth aspect, there is a method of making a glass article comprising: forming a modification layer on a bonding surface of a second sheet by depositing an organosilane monomer on the bonding surface of the second sheet, the modification layer comprising organosilicon and the modification layer having a modification layer bonding surface;

increasing the surface energy of the modification layer bonding surface; and bonding the bonding surface of a first sheet to the bonding surface of the modification layer.

In an example of aspect 4, the surface energy of the modification layer bonding surface is increased by exposure to nitrogen, oxygen, hydrogen, carbon dioxide gas or a combination thereof.

In another example of aspect 4, the surface energy of the modification layer bonding surface is increased to equal to or greater than 55 mJ/m² at less than a 60° water/air contact angle.

In another example of aspect 4, the modification layer has a thickness in the range of 5 nm to 10 microns.

In another example of aspect 4, the first sheet is glass having a thickness of 300 microns or less and the second sheet is glass having a thickness of 300 microns or greater.

In another example of aspect 4, the modification layer has an atomic percent ratio of oxygen to silicon of less than 0.9, wherein the atomic percent of silicon and oxygen is measured from the modification layer prior to surface modification and being in contact with the bonding surface of the first sheet.

In another example of aspect 4, the modification layer has an atomic percent ratio of oxygen to silicon of less than 0.8, wherein the atomic percent of silicon and oxygen is measured from the modification layer prior to surface modification and being in contact with the bonding surface of the first sheet.

In another example of aspect 4, the modification layer has an oxygen and nitrogen atom content of less than 40 atomic percent of the total amount of atoms present excluding hydrogen, wherein the atomic percent of oxygen and nitrogen is measured from the modification layer bonding surface prior to being in contact with the bonding surface of the first sheet.

In another example of aspect 4, the modification layer bonding surface has an atomic percent ratio of oxygen to silicon of 1 to 3 and an atomic percent ratio of nitrogen to silicon in the range of 2.5 to 6.5, wherein the atomic percent of silicon, oxygen and nitrogen is measured from the modification layer bonding surface after the glass article is held at 700° C. for 10 minutes in nitrogen and then the first sheet is separated from the second sheet after the glass article is cooled to room temperature.

In another example of aspect 4, the modification layer bonding surface has an atomic percent ratio of oxygen to silicon of less than 2.6, wherein the atomic percent of silicon and oxygen is measured from the modification layer bonding surface after the glass article is held at 700° C. for 10 minutes in nitrogen and then the first sheet is separated from the second sheet after the glass article is cooled to room temperature.

In another example of aspect 4, the modification layer is formed by deposition of a compound selected from the group consisting of phenylsilicon, methylphenylsilicon, diphenylsilicon, methlydiphenylsilicon and triphenylsilicon.

In another example of aspect 4, the modification layer is not a monolayer.

In another example of aspect 4, the modification layer is a polymerized amorphous arylsilicon.

In another example of aspect 4, the organosilane monomer having formula $(R_1)_x Si(R_2)_y$, wherein $R_1$ is an aryl, alkyl, alkynyl and/or alkenyl and x is 1, 2 or 3, $R_2$ is hydrogen, halogen, an aryl, alkyl, alkynyl and/or alkenyl, or a combination thereof and y is 1, 2 or 3, wherein $R_1$ and $R_2$ are not oxygen.

In a fifth aspect, there is provided the method of aspect 4, the organosilane monomer has a formula $(R_1)_x Si(R_2)_y$, wherein $R_1$ is an aryl, alkyl, alkynyl and/or alkenyl and x is 1, 2 or 3, $R_2$ is hydrogen, halogen, an aryl, alkyl, alkynyl and/or alkenyl, or a combination thereof and y is 1, 2 or 3, wherein $R_1$ and $R_2$ are not oxygen.

In an example of aspect 5, $R_1$ or $R_2$ is an aryl, phenyl, tolyl, xylyl, naphthyl or a combination thereof.

In another example of aspect 5, $R_2$ is hydrogen, methyl or a combination thereof.

In another example of aspect 5, $R_1$ or $R_2$ is an aryl.

In another example of aspect 5, $R_1$ or $R_2$ is a di-aryl.

In another example of aspect 5, the organosilane monomer is selected from the group consisting of phenylsilane, methylphenylsilane, diphenylsilane, methlydiphenylsilane and triphenylsilane.

In another example of aspect 5, the organosilane monomer is free of an oxygen atom.

The fifth aspect may be provided alone or in combination with any one or more of the examples of the fifth aspect discussed above.

In another example of aspect 4, the bonding surface of the first sheet is bonded with the modification layer bonding surface with a bond energy of less than 600 mJ/m² after holding the glass article at 600° C. for 10 minutes in a nitrogen atmosphere.

In another example of aspect 4, the bonding surface of the first sheet is bonded with the modification layer bonding surface with a bond energy of less than 600 mJ/m² after holding the glass article at 700° C. for 10 minutes in a nitrogen atmosphere.

In another example of aspect 4, the bonding surface of the first sheet is bonded with the modification layer bonding surface with a bond energy of less than 600 mJ/m² after holding the glass article at 750° C. for 10 minutes in a nitrogen atmosphere.

In another example of aspect 4, the bonding surface of the first sheet is bonded with the modification layer bonding surface with a bond energy of less than 450 mJ/m² after holding the glass article at 650° C. for 10 minutes in a nitrogen atmosphere.

The fourth aspect may be provided alone or in combination with any one or more of the examples of the fourth aspect discussed above.

The accompanying drawings are included to provide a further understanding of the principles described, and are incorporated in and constitute a part of this specification. The drawings illustrate one or more embodiment(s), and together with the description serve to explain, by way of example, principles and operation of those embodiments. It is to be understood that various features disclosed in this specification and in the drawings can be used in any and all combinations. By way of non-limiting example the various features may be combined with one another as set forth in the specification as aspects.

BRIEF DESCRIPTION OF THE DRAWINGS

The above description and other features, aspects and advantages are better understood when the following detailed description is read with reference to the accompanying drawings, in which.

DETAILED DESCRIPTION

Figure 1:
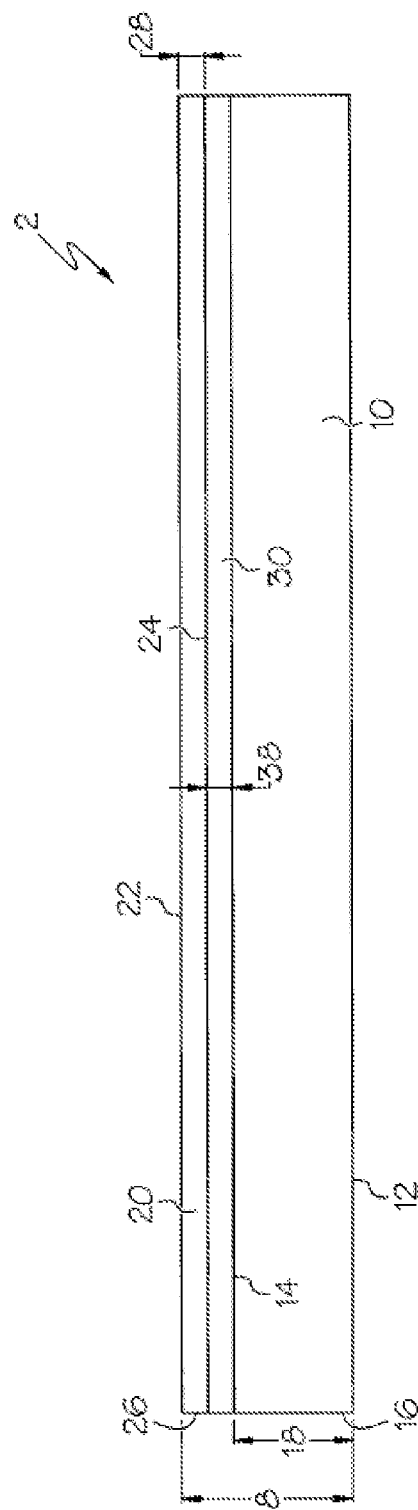
FIG. 1 is a schematic side view of an article having carrier bonded to a thin sheet with a modification layer therebetween.

In the following detailed description, for purposes of explanation and not limitation, example embodiments disclosing specific details are set forth to provide a thorough understanding of various principles and aspects of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles set forth herein. Finally, wherever applicable, like reference numerals refer to like elements.

Directional terms as used herein (e.g., up, down, right left, front, back, top, bottom) are made only with reference to the figures as drawn and are not intended to imply absolute orientation.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Provided are solutions for allowing the processing of a thin sheet on a carrier, whereby at least portions of a first sheet, for example, a thin glass sheet, remain "controllably bonded" with a second sheet, for example a carrier, so that devices processed on the thin sheet may be removed from the carrier. In order to maintain advantageous surface shape characteristics, the carrier is typically a display grade glass substrate. Accordingly, in some situations, it is wasteful and expensive to merely dispose of the carrier after one use. Thus, in order to reduce costs of display manufacture, it is desirable to be able to reuse the carrier to process more than one thin sheet substrate. The present disclosure sets forth articles and methods for enabling a thin sheet to be processed through the harsh environment of processing lines including high temperature processing and yet still allowing the thin sheet to be easily removed from the carrier without damage (for example, wherein one of the carrier and the thin sheet breaks or cracks into two or more pieces) to the thin sheet or carrier, whereby the carrier may be reused. High temperature processing may include processing at a temperature ≥400° C., and may vary depending upon the type of device being made. For example, high temperature processing may include temperatures up to about 450° C. as in amorphous silicon or amorphous indium gallium zinc oxide (IGZO) backplane processing, up to about 500-550° C. as in crystalline IGZO processing, or up to about 600-650° C. as is typical in LTPS and TFT processes. The articles and methods of the present disclosure can be applied to other high-temperature processing, for example, in the range of 700° to 800° C., and yet still allow the thin sheet to be removed from the carrier without significantly damaging the thin sheet.

Figure 2:
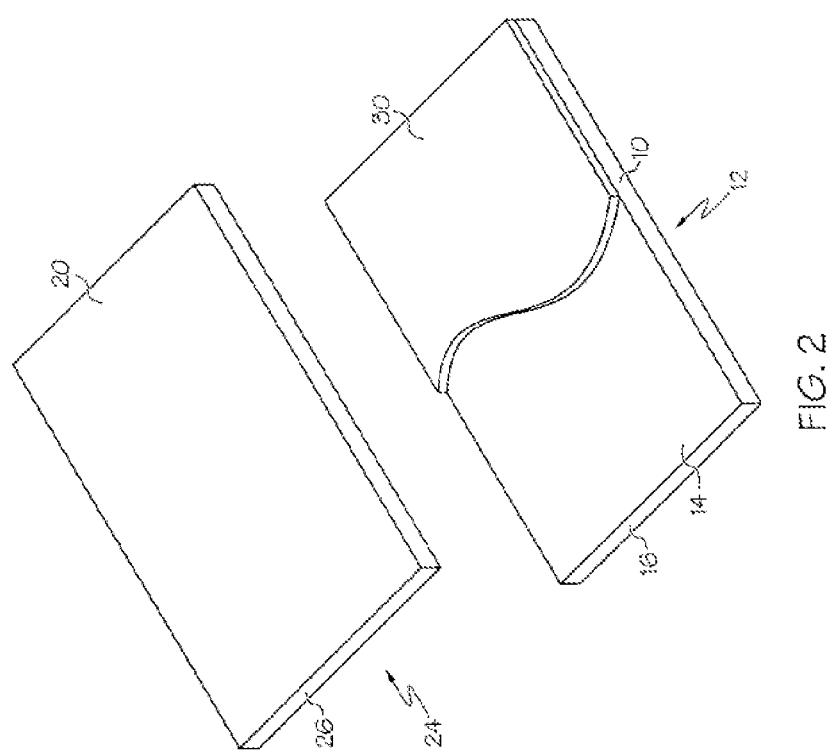
FIG. 2 is an exploded and partially cut-away view of the article in FIG. 1.

As shown in FIGS. 1 and 2, a glass article 2 has a thickness 8, and includes a first sheet 20 (e.g., thin glass sheet, for example, one having a thickness of equal to or less than about 300 microns, including but not limited to thicknesses of, for example, 10-50 microns, 50-100 microns, 100-150 microns, 150-300 microns, 300, 250, 200 190, 180, 170, 160, 150 140, 130, 120 110 100, 90, 80, 70, 60, 50, 40 30, 20, or 10, microns) having a thickness 28, a modification layer 30 having a thickness 38, and a second sheet 10 (e.g., a carrier) having a thickness 18.

The glass article 2 is arranged to allow the processing of thin sheet 20 in equipment designed for thicker sheets, for example, those on the order of greater than or equal to about 0.4 mm, for example 0.4 mm, 0.5 mm, 0.6 mm, 0.7 mm, 0.8 mm, 0.9 mm, or 1.0 mm, although the thin sheet 20 itself is equal to or less than about 300 microns. The thickness 8, which is the sum of thicknesses 18, 28, and 38, can be equivalent to that of the thicker sheet for which a piece of equipment, for example, equipment designed to dispose electronic device components onto substrate sheets, was designed to process. In an example, if the processing equipment was designed for a 700 micron sheet, and the thin sheet had a thickness 28 of 300 microns, then thickness 18 would be selected as 400 microns, assuming that thickness 38 is negligible. That is, the modification layer 30 is not shown to scale, but rather it is greatly exaggerated for sake of illustration only. Additionally, in FIG. 2, the modification layer is shown in cut-away. The modification layer can be disposed uniformly over the bonding surface 14 when providing a reusable carrier. Typically, thickness 38 will be on the order of nanometers, for example 2 nm to 1 micron, 5 nm to 250 nm, or 20 to 100 nm, or about 30, 40, 50, 60, 70, 80 or 90 nm. The presence of a modification layer may be detected by surface chemistry analysis, for example by time-of-flight secondary ion mass spectrometry (ToF Sims).

Carrier 10 has a first surface 12, a bonding surface 14, and a perimeter 16. The carrier 10 may be of any suitable material including glass. The carrier can be a non-glass material, for example, ceramic, glass-ceramic, silicon, or metal, as the surface energy and/or bonding may be controlled in a manner similar to that described below in connection with a glass carrier. If made of glass, carrier 10 may be of any suitable composition including aluminosilicate, boro-silicate, alumino-boro-silicate, soda-lime-silicate, and may be either alkali containing or alkali-free depending upon its ultimate application. Thickness 18 may be from about 0.2 to 3 mm, or greater, for example 0.2, 0.3, 0.4, 0.5, 0.6, 0.65, 0.7, 1.0, 2.0, or 3 mm, or greater, and will depend upon the thickness 28, and thickness 38 when such is non-negligible, as noted above. In one embodiment, the carrier 10 may be made of one layer, as shown, or multiple layers (including multiple thin sheets) that are bonded together. Further, the carrier may be of a Gen 1 size or larger, for example, Gen 2, Gen 3, Gen 4, Gen 5, Gen 8 or larger (e.g., sheet sizes from 100 mm×100 mm to 3 meters×3 meters or greater).

The thin sheet 20 has a first surface 22, a bonding surface 24, and a perimeter 26. Perimeters 16 (carrier) and 26 may be of any suitable shape, may be the same as one another, or may be different from one another. Further, the thin sheet 20 may be of any suitable material including glass, ceramic, or glass-ceramic, silicon wafer, or metal. As described above for the carrier 10, when made of glass, thin sheet 20 may be of any suitable composition, including alumino-silicate, boro-silicate, alumino-boro-silicate, soda-lime-silicate, and may be either alkali containing or alkali free depending upon its ultimate application. The coefficient of thermal expansion of the thin sheet can be substantially the same as that of the carrier to reduce warping of the article during processing at elevated temperatures. The thickness 28 of the thin sheet 20 is 300 microns or less, as noted above. Further, the thin sheet may be of a Gen 1 size or larger, for example, Gen 2, Gen 3, Gen 4, Gen 5, Gen 8 or larger (e.g., sheet sizes from 100 mm×100 mm to 3 meters×3 meters or greater).

The glass article 2 can have a thickness that accommodates processing with existing equipment, and likewise it can survive the harsh environment in which the processing takes place. For example, FPD processing may include wet ultrasonic, vacuum, and high temperature (e.g., ≥400° C.), processing. For some processes, as noted above, the temperature may be ≥500° C., ≥550° C., ≥600° C., ≥650° C., ≥700° C., and up to 750° C.

To survive the harsh environment in which article 2 will be processed, the bonding surface 14 should be bonded to bonding surface 24 with sufficient strength so that the first sheet 20 does not separate from second sheet 10. And this strength should be maintained throughout the processing so that sheet 20 does not separate from sheet 10 during processing. Further, to allow sheet 20 to be removed from sheet 10 (so that carrier 10 may be reused), the bonding surface 14 should not be bonded to bonding surface 24 too strongly either by the initially designed bonding force, and/or by a bonding force that results from a modification of the initially designed bonding force as may occur, for example, when the article undergoes processing at high temperatures, e.g., temperatures of ≥400° C. to ≥750° C. The surface modification layer 30 may be used to control the strength of bonding between bonding surface 14 and bonding surface 24 so as to achieve both of these objectives. The controlled bonding force is achieved by controlling the contributions of van der Waals (and/or hydrogen bonding) and covalent attractive energies to the total adhesion energy which is controlled by modulating the polar and non-polar surface energy components of sheet 20 and sheet 10. This controlled bonding is strong enough to survive FPD processing, for instance, including temperatures ≥400° C., and in some instances, processing temperatures of ≥500° C., ≥550° C., ≥600° C., ≥650° C., ≥700° C., and up to 750° C., and remain de-bondable by application of a force sufficient to separate the sheets but not to cause significant damage to sheet 20 and/or sheet 10. For example, the force should not break either the sheet 20 or sheet 10. Such de-bonding permits removal of sheet 20 and the devices fabricated thereon, and also allows for re-use of sheet 10 as a carrier, or for some other purpose.

Although the modification layer 30 is shown as a solid layer between sheet 20 and sheet 10, such need not be the case. For example, the layer 30 may be on the order of 0.1 nm to 1 µm thick (e.g., 1 nm to 10 nm, 10 nm to 50 nm, 100 nm, 250 nm, 500 nm to 1 µm), and may not completely cover the entire portion of the bonding surface 14. For example, the coverage may be ≤100%, from 1% to 100%, from 10% to 100%, from 20% to 90%, or from 50% to 90% of the bonding surface 14. In other embodiments, the layer 30 may be up to 50 nm thick, or in other embodiments even up to 100 nm to 250 nm thick. The modification layer 30 may be considered to be disposed between sheet 10 and sheet 20 even though it may not contact one or the other of sheet 10 and sheet 20. In another aspect of the modification layer 30, the layer modifies the ability of the bonding surface 14 to bond with bonding surface 24, thereby controlling the strength of the bond between the sheet 10 and sheet 20. The material and thickness of the modification layer 30, as well as the treatment of the bonding surfaces 14, 24 prior to bonding, can be used to control the strength of the bond (energy of adhesion) between sheet 10 and sheet 20.

Deposition of the Modification Layer

Examples of coating methods, for providing a modification layer, include chemical vapor deposition (CVD) techniques, and like methods. Specific examples of CVD techniques include CVD, low pressure CVD, atmospheric pressure CVD, Plasma Enhanced CVD (PECVD), atmospheric plasma CVD, atomic layer deposition (ALD), plasma ALD, and chemical beam epitaxy.

The reactive gas mixture used to produce the films may also comprise a controlled amount of a source gas (carrier gas) selected from hydrogen and inert gases (Group VIII in the periodic table) for example, He, Ar, Kr, Xe. When using low radio frequency (RF) energy, the source gas may comprise nitrogen. The amount of source gas may be controlled by the type of gas used, or by the film deposition process conditions.

Surface Energy of the Modification Layer

In general, the surface energy of the modification layer 30 can be measured upon being deposited and/or after being further treated, for example by activation with nitrogen. The surface energy of the solid surface is measured indirectly by measuring the static contact angles of three liquids—water, diiodomethane and hexadecane—individually deposited on the solid surface in air. From the contact angle values of the three liquids, a regression analysis is done to calculate the polar and dispersion energy components of the solid surface. The theoretical model used to calculate the surface energy values includes the following three independent equations relating the three contact angle values of the three liquids and the dispersion and polar components of surface energies of the solid surface as well as the three test liquids $$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (1)$$

$$\gamma_D(1+\cos\theta_D) = 4\left(\frac{\gamma_D^d \gamma_S^d}{\gamma_D^d + \gamma_S^d} + \frac{\gamma_D^p \gamma_S^p}{\gamma_D^p + \gamma_S^p}\right) \quad (2)$$

$$\gamma_H(1+\cos\theta_H) = 4\left(\frac{\gamma_H^d \gamma_S^d}{\gamma_H^d + \gamma_S^d} + \frac{\gamma_H^p \gamma_S^p}{\gamma_H^p + \gamma_S^p}\right) \quad (3)$$

where, the subscripts "W", "D" and "H" stand for water, diiodomethane and hexadecane, respectively, and the superscripts "d" and "p" stand for dispersion and polar components of surface energies, respectively. Since diiodomethane and hexadecane are practically non-polar liquids, the above set of equations reduces to:

$$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (4)$$

$$\gamma_D(1+\cos\theta_D) = 4\left(\frac{\gamma_D^d \gamma_S^d}{\gamma_D^d + \gamma_S^d}\right) \quad (5)$$

$$\gamma_H(1+\cos\theta_H) = 4\left(\frac{\gamma_H^d \gamma_S^d}{\gamma_H^d + \gamma_S^d}\right) \quad (6)$$

From the above set of three equations (4-6), by regression analysis, the two unknown parameters, dispersion and polar surface energy components of the solid surface, $\gamma_S^d$ and $\gamma_S^p$ are calculated. However, with this approach, there is a limiting maximum value up to which the surface energy of the solid surface could be measured. That limiting maximum value is the surface tension of water which is 73 mJ/m². If the surface energy of the solid surface is appreciably greater than the surface tension of water, the surface will be fully wetted by water, thereby rendering the contact angle approach zero. Beyond this value of surface energy, therefore, all calculated surface energy values would correspond to ~73-75 mJ/m² irrespective of the real surface energy value. For example, if the real surface energies of two solid surfaces are 75 mJ/m² and 150 mJ/m², the calculated values using the liquid contact angles will be ~75 mJ/m² for both surfaces.

Accordingly, all contact angles disclosed herein are measured by placing liquid droplets on the solid surface in air and measuring the angle between the solid surface and the liquid-air interface at the contact line. Therefore, when a claim is made on the surface energy value being from 55 mJ/m² to 75 mJ/m² it should be understood that these values correspond to calculated surface energy values based on the method described above and not the real surface energy values which could be greater than 75 mJ/m² when the calculated value approaches that value.

Bonding Energy of the First Sheet to the Modification Layer

In general, the energy of adhesion (i.e., bond energy) between two surfaces can be measured by a double cantilever beam method or wedge test. The tests simulate in a qualitative manner the forces and effects on an adhesive bond joint at a modification layer/first sheet interface. Wedge tests are commonly used for measuring bonding energy. For example, ASTM D5041, Standard Test Method for Fracture Strength in Cleavage of Adhesives in Bonded Joints, and ASTM D3762, Standard Test Method for Adhesive-Bonded Surface Durability of Aluminum, are standard test methods for measuring bonding of substrates with a wedge.

A summary of the test method includes recording the temperature and relative humidity under which the testing is conducted, for example, that in a lab room. The first sheet is gently pre-cracked or separated at a corner of the glass article locally to break the bond between the first sheet and the second sheet. A sharp razor can be used to pre-crack the first sheet from the second sheet, for example, a GEM brand razor with a thickness of 228±20 microns. In forming the pre-crack, momentary sustained pressure may be needed to fatigue the bond. A flat razor having the aluminum tab removed is slowly inserted until the crack front can be observed to propagate such that the crack separation increases. The flat razor does not need to be inserted significantly to induce a crack. Once a crack is formed, the glass article is permitted to rest for at least 5 minutes to allow the crack to stabilize. Longer rest times may be needed for high humidity environments, for example, above 50% relative humidity.

The glass article with the developed crack is evaluated with a microscope to record the crack length. The crack length is measured from the end separation point of the first sheet from the second sheet (i.e. furthest separation point from the tip of razor) and the closest non-tapered portion of the razor. The crack length is recorded and used in the following equation to calculate bond energy.

$$\gamma = 3t_b^2 E_1 t_{w1}^3 E_2 t_{w2}^3 / 16 L^4 (E_1 t_{w1}^3 E_2 t_{w2}^3) \quad (7)$$

wherein γ is the bond energy, $t_b$ is the thickness of the blade, razor or wedge, $E_1$ is the Young's modulus of the first sheet 20 (e.g., thin glass sheet), $t_{w1}$ is the thickness of the first sheet, $E_2$ is the Young's modulus of the second sheet 10 (e.g., a glass carrier), $t_{w2}$ is the thickness of the second sheet 10 and L is the crack length between the first sheet 20 and second sheet 10 upon insertion of the blade, razor or wedge as described above.

The bond energy is understood to behave as in silicon wafer bonding, where an initially hydrogen bonded pair of wafers are heated to convert much or all the silanol-silanol hydrogen bonds to Si—O—Si covalent bonds. While the initial, room temperature, hydrogen bonding produces bond energies of the order of about 100-200 mJ/m² which allows separation of the bonded surfaces, a fully covalently bonded wafer pair as achieved during high temperature processing (on the order of 400 to 800° C.) has adhesion energy of about 2000-3000 mJ/m² which does not allow separation of the bonded surfaces; instead, the two wafers act as a monolith. On the other hand, if both the surfaces are perfectly coated with a low surface energy material, for example a fluoropolymer, with thickness large enough to shield the effect of the underlying substrate, the adhesion energy would be that of the coating material, and would be very low leading to low or no adhesion between the bonding surfaces 14, 24. Accordingly, the thin sheet 20 would not be able to be processed on carrier 10. Consider two extreme cases: (a) two standard clean 1 (SC1, as known in the art) cleaned glass surfaces saturated with silanol groups bonded together at room temperature via hydrogen bonding (whereby the adhesion energy is about 100-200 mJ/m²) followed by heating to a temperature that converts the silanol groups to covalent Si—O—Si bonds (whereby the adhesion energy becomes 2000-3000 mJ/m²). This latter adhesion energy is too high for the pair of glass surfaces to be detachable; and (b) two glass surfaces perfectly coated with a fluoropolymer with low surface adhesion energy (about 12-20 mJ/m² per surface) bonded at room temperature and heated to high temperature. In this latter case (b), not only do the surfaces not bond at low temperature (because the total adhesion energy of about 24-40 mJ/m$^2$, when the surfaces are put together, is too low), they do not bond at high temperature either as there are too few polar reacting groups. Between these two extremes, a range of adhesion energies exist, for example between 50-1000 mJ/m$^2$, which can produce the desired degree of controlled bonding. Accordingly, the inventors have found various methods of providing a modification layer 30 leading to a bonding energy that is between these two extremes, and such that there can be produced a controlled bonding sufficient to maintain a pair of glass substrates (for example a glass carrier 10 and a thin glass sheet 20) bonded to one another through the rigors of FPD processing but also of a degree that (even after high temperature processing of, e.g. ≥400° C. to 750° C.) allows the detachment of sheet 20 from sheet 10 after processing is complete.

Moreover, the detachment of the sheet 20 from sheet 10 can be performed by mechanical forces, and in such a manner that there is no significant damage to at least sheet 20, and preferably also so that there is no significant damage to sheet 10.

An appropriate bonding energy can be achieved by using select surface modifiers, i.e., modification layer 30, and/or thermal or nitrogen treatment of the surfaces prior to bonding. The appropriate bonding energy may be attained by the choice of chemical modifiers of either one or both of bonding surface 14 and bonding surface 24, which chemical modifiers control both the van der Waal (and/or hydrogen bonding, as these terms are used interchangeably throughout the specification) adhesion energy as well as the likely covalent bonding adhesion energy resulting from high temperature processing (e.g., on the order of ≥400° C. to 750° C.).

Figure 3:
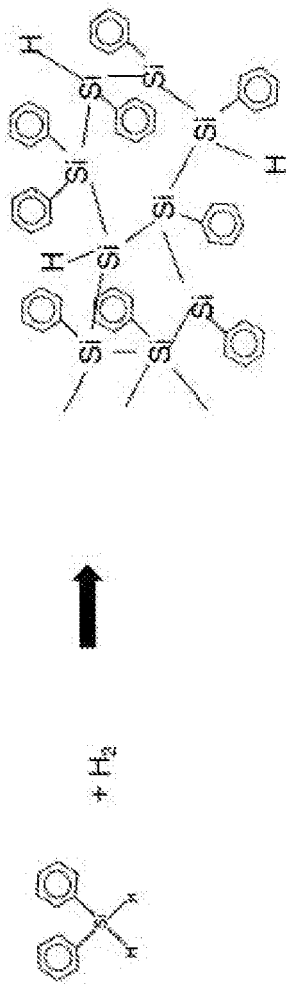
FIG. 3 is a schematic of an example of a reaction of hydride arylsilicon to form an arylsilicon polymer.

The inventors have found that an article including a thin sheet and a carrier, suitable for FPD processing (including LTPS processing), can be made by coating the first sheet 20 and or second sheet 10 with an organosilicon modification layer containing, for example, at least one of phenylsilicon, methylphenylsilicon, diphenylsilicon, methyldiphenylsilicon and triphenylsilicon or a combination thereof. The modification layer 30 is not a monolayer. For example, the modification layer 30 can be a polymerized amorphous organosilicon as shown in FIG. 3. In other words, the modification layer 30 is not a self-assembled monolayer as known in the art, but has a thickness greater than 10 nm, and for example greater than 20 nm.

The organosilicon layer may be formed by depositing an organosilane monomer on the receiving surface. The organosilane monomer can have the formula $(R_1)_x Si(R_2)_y$, wherein $R_1$ can be an aryl, alkyl, alkynyl and/or alkenyl and x is 1, 2 or 3, and $R_2$ can be hydrogen, halogen, an aryl, alkyl, alkynyl and/or alkenyl, or a combination thereof and y is 1, 2 or 3, and wherein $R_1$ and $R_2$ are not oxygen. For example, $R_1$ or $R_2$ can be an aryl, phenyl, tolyl, xylyl, naphthyl or a combination thereof. In various embodiments $R_1$ or $R_2$ is an aryl or a di- or tri-aryl. In another example, the organosilane monomer can be selected from phenylsilane, methylphenylsilane, diphenylsilane, methyldiphenylsilane and triphenylsilane. In yet another example, the organosilane monomer can be free of an oxygen atom.

Figure 4:
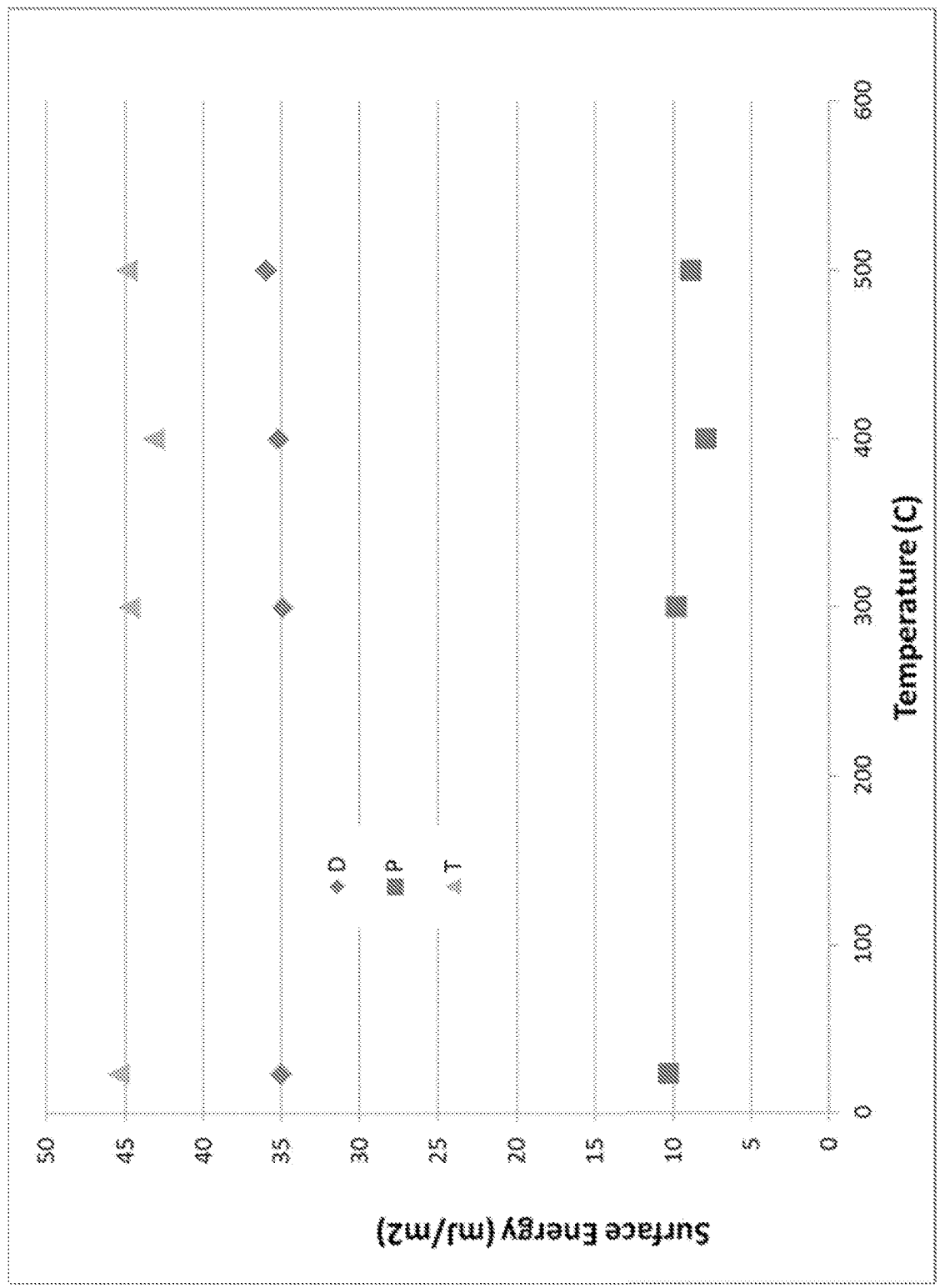
FIG. 4 is a graph of the surface energy of phenylsilicon layers having a thickness of 2 microns.

The modification layer 30 can provide a bonding surface with a surface energy in a range of from about 55 to about 75 mJ/m$^2$, as measured for one surface (including polar and dispersion components), whereby the surface produces only weak bonding. The desired surface energy required for bonding may not be the surface energy of the initially deposited organosilicon modification layer. For example, the deposited layer may be further treated. As initially deposited, and without further processing, the organosilicon modification layers show good thermal stability. For example, FIG. 4 shows the thermal stability of phenylsilicon layers having a thickness of 2 microns. As shown, the total surface energy (triangular data points represent the total surface energy, diamond data points represent the dispersion component, and square data points represent the polar component) does not significantly change after heating the layers to 500° C. Because of the low surface energy of the tested phenylsilicon layers, e.g., those shown in FIG. 4, surface activation may be desirable for bonding to glass. Surface energy of the deposited organosilicon layers can be raised to 76 mJ/m$^2$ by exposure to $N_2$, $N_2$—$H_2$, $N_2$—$O_2$, $NH_3$, $N_2H_4$, $HN_3$, $CO_2$, or mixtures thereof, plasma exposure. Table 1 shows the contact angle (for water "W", hexadecane "HD" and diiodomethane "DIM") and surface energy (dispersion component "D", polar component "P", and total "T", as measured by fitting a theoretical model developed by S. Wu (1971) to three contact angles of the three aforementioned test liquids W, HD, DIM. See. S. Wu, J. Polym. Sci. C, 34, 19, 1971) of phenylsilicon ("PS") and diphenylsilicon ("DPS") layers. Additionally, Table 1 shows whether the PS or DPS layers were plasma treated or not, and indicates the particular plasma treatment in the "TREAT" column. Thus, for example, the first line of Table 1 indicates that a PS layer was not plasma treated, and that had a W contact angle of 74.5, a HD contact angle of 2.63, a DIM contact angle of 24.4, and a total surface energy of 47.42 mJ/m$^2$ of which the dispersion component accounted for 35.69 mJ/m$^2$ and the polar component accounted for 11.73 mJ/m$^2$. Similarly, the second line of Table 1 indicates that a PS layer was plasma treated with N2-O2 and resultantly had a W contact angle of 13.7, a HD contact angle of 3.6, a DIM contact angle of 40.8, and a total surface energy of 74.19 mJ/m$^2$ of which the dispersion component accounted for 32.91 mJ/m$^2$ and the polar component accounted for 41.28 mJ/m$^2$.

TABLE 1

| FILM | TREAT | W | HD | DIM | D | P | T |
|---|---|---|---|---|---|---|---|
| PS | None | 74.5 | 2.63 | 24.4 | 35.69 | 11.73 | 47.42 |
| PS | N2—O2 | 13.7 | 3.6 | 40.8 | 32.91 | 41.28 | 74.19 |
| PS | N2 | 19.67 | 8 | 34.93 | 33.87 | 38.95 | 72.82 |
| DPS | None | 50.2 | 8.27 | 20.6 | 35.99 | 23.91 | 59.9 |
| DPS | CO2 | 8.57 | 13.83 | 11.53 | 36.47 | 40.43 | 76.9 |
| DPS | N2—H2 | 3.37 | 22.67 | 36.97 | 32.28 | 43.09 | 75.37 |
| DPS | NH3 | 3.8 | 26.37 | 38.5 | 31.55 | 43.48 | 75.03 |

As can be seen, the total surface energy of phenylsilicon and diphenylsilicon layers can be increased to that of about water, or about 72-74 mJ/m$^2$.

The modification layer achieves the desired bonding of the first sheet 20 and the second sheet 10 by having an atomic percent ratio of certain atoms, e.g., oxygen, silicon and nitrogen. X-ray photoelectron spectroscopy (XPS) can be used to determine the surface composition of organosilicon layers before and after plasma treatment, for example, $N_2$ plasma surface activation. It is notable that XPS is a surface sensitive technique and the sampling depth is about several nanometers.

In an example, the atomic percent ratio of the surface composition of phenylsilicon layers before and after $N_2$ plasma surface activation is shown in Table 2 below. The phenylsilicon layers as described below were deposited from organosilicon hydride precursors with a hydrogen carrier gas in an Applied Materials P5000 universal CVD apparatus from phenylsilane and hydrogen with the following process conditions: a temperature of 390° C. with 120 standard cubic centimeters (sccm) of helium through the phenylsilane bubbler held at 85° C. and 600 sccm $H_2$, a pressure of 9 torr, a gap of 210 millimeters and 300 watts (W), 13.56 MHz RF energy and a phenylsilane ampoule at 30° C. The deposition rate of the layers was about 1000 nm/min.

The methylphenylsilicon layers were deposited in the same Applied Materials P5000 universal CVD apparatus with the following process conditions: a temperature of 390° C. with 200 sccm of helium through the methylphenylsilane bubbler held at 85° C. and 600 sccm $H_2$, a pressure of 9 torr, a gap of 210 millimeters and 450 W RF and a methylphenylsilane ampoule at 80° C.

The diphenylsilicon layers were deposited in the same Applied Materials P5000 universal CVD apparatus with the following process conditions: a temperature of 390° C. with 500 sccm He through the diphenylsilane bubbler held at 85° C., 600 sccm $H_2$, a pressure of 9 torr, a gap of 210 millimeters and 300 W RF and the diphenylsilane ampoule at 80° C. It is believed that other precursors, for example organosilicon halides, would produce similar results as shown and described herein.

TABLE 2

|  | C | N | O | F | Si | sum |
|---|---|---|---|---|---|---|
| Phenylsilicon | 72.7 | 0.1 | 9.4 | 0 | 17.8 | 100 |
| Phenysilicon + N2 Surface Activation | 23.1 | 12.5 | 45.6 | 0.4 | 18.4 | 100 |

As deposited, the modification layer surface of the phenylsilicon layer contains about a 4:1 C:Si atomic percent ratio and about a 0.5:1 O:Si atomic percent ratio. Although no oxygen was deliberately added during the deposition process, the as-deposited phenylsilicon layer contained 9.4 atomic percent of oxygen. The presence of oxygen in the surface composition of the organosilicon layer may result from scavenging oxygen containing species from deposition equipment, for example, reactor walls, impurities in source materials, or even a reaction of the plasma activated surface of the modification layer with atmospheric moisture and oxygen after the glass article or sample is removed from the deposition equipment (e.g., a deposition chamber). Table 2 shows that after activation of the modification layer with $N_2$, nitrogen was increased to 12.5 atomic percent as that element was incorporated into the surface. The O:Si atomic percent ratio increased to about 2.5:1 and the C:Si ratio decreased to about 1.25:1. The atomic percent presence of Si remained nearly unchanged after surface treatment of the phenylsilicon layer.

In another example, the atomic percent ratio of the surface composition of phenylsilicon layers before and after $N_2$ plasma surface activation is shown in Table 3 below.

TABLE 3

|  | Si—C or Si—Si | Si—O silane | SiO2 |
|---|---|---|---|
| Phenylsilicon | 12.7 | 4.5 | 0.5 |
| Phenysilicon + N2 Surface Activation | 17 | 1 | 15.7 |

The Si2p surface composition shown in Table 3 shows the Si bonding in the surface of the as-deposited modification layer is primarily Si—C or Si—Si with only about 25% of the Si being bonded to oxygen. Upon surface activation of the modification layer with $N_2$, most of the surface oxygen present in the modification layer is in the form of $SiO_2$. Thus, there is a low presence of Si—O bonds after activation.

In another example, the atomic percent ratio of the surface composition of phenylsilicon layers before and after $N_2$ plasma surface activation is shown in Table 4 below.

TABLE 4

|  | C—C or C—H | C—O— or C—N | C=O, C—N | O=C—O | pi-pi trans. |
|---|---|---|---|---|---|
| Phenylsilicon | 69 | 1.3 | 0 | 0.2 | 2.2 |
| Phenysilicon + N2 Surface Activation | 11.7 | 5.3 | 4 | 2 | 0.1 |

The C1s surface composition shown in Table 4 shows the C—C, C—H and pi-pi bonding in the as-deposited surface of the modification layer is primarily C—C or C—H bonding with pi-pi transitions being observed. After $N_2$ plasma activation, the C—C, C—H and pi-pi bonding in the surface of the modification layer is significantly decreased and more polar C—O or C—N species being observed.

In yet another example, the atomic percent ratio of the surface composition of phenylsilicon layers before and after $N_2$ plasma surface activation is shown in Table 5 below.

TABLE 5

|  | N—C or N=C | —NH2 |
|---|---|---|
| Phenylsilicon |  |  |
| Phenysilicon + N2 Surface Activation | 4.6 | 7.9 |

The N1 surface composition shown in Table 4 shows the nitrogen in the form of N—C, N=C and $NH_2$ is introduced with $N_2$ surface activation of the modification layer. For example, 63% of the nitrogen is introduced to the surface as an amine. These polar surface groups may be responsible for plasma activation of the modification layer surface, thereby raising the surface energy of the organosilicon modification layer, e.g., phenylsilicon, to nearly that of glass (i.e. about 74 mJ/m$^2$) and thus allowing bonding with a thin glass sheet.

The individual atomic elements of the surface composition of a deposited modification methylphenylsilicon (MPS) and diphenlysilicon (DPS) layers before and after surface activation with $N_2$ were measured and reported below in Table 6.

TABLE 6

| atomic % | C | N | O | F | Si |
|---|---|---|---|---|---|
| MPS | 75.0 | 0.0 | 8.1 | 0.2 | 16.7 |
| MPS + N2 | 35.3 | 10.8 | 36.9 | 0.8 | 16.2 |
| DPS | 82.7 | 0.0 | 7.4 | 0.2 | 9.6 |
| DPS + N2 | 42.4 | 14.4 | 30.2 | 0.7 | 12.3 |

The as-deposited modification layers contain no detectable nitrogen and have an O:Si ratio of 0.49 for MPS and 0.78 for DPS. As shown, $N_2$ plasma activation incorporates 10.8 atomic percent nitrogen into MPS, 14.4 atomic percent nitrogen into DPS, and increases the O:Si ratio of the modification layer surface to over 2.

The surface composition of the modification layers was tested at different stages to determine the changes in surface chemistry. Table 7 below shows the impact of annealing with and without $N_2$ surface activation and bonding to a thin glass sheet.

TABLE 7

|  | B | C | N | O | F | Al | Si | Ca | Sr |
|---|---|---|---|---|---|---|---|---|---|
| DPS as deposited A1 | 0.77 | 62.89 | 0.27 | 13.81 | 0.63 | 0 | 21.63 | 0 | 0 |
| DPS as deposited A2 | 0 | 63.46 | 0.45 | 13.42 | 0.52 | 0 | 22.15 | 0 | 0 |
| DPS unbonded no N2 treatment 700 C. 10 min A3 | 0 | 60.81 | 0 | 16.46 | 1.97 | 0.1 | 20.66 | 0 | 0 |
| DPS N2 treated, bonded, annealed 700 C./10 m debonded | 0.45 | 43.07 | 5.38 | 32.62 | 1.04 | 0 | 17.45 | 0 | 0 |
| DPS N2 treated, bonded, annealed 700 C./10 m debonded | 0 | 45.5 | 5.71 | 30.87 | 0.96 | 0 | 16.83 | 0.13 | 0 |
| DPS N2 treated, bonded, annealed 700 C./10 m debonded | 2.02 | 9.41 | 3.74 | 57.18 | 0.46 | 3.87 | 22.22 | 1 | 0.1 |

The DPS layers that were annealed at 700° C. for 10 minutes in $N_2$ without surface activation or bonding showed only slight oxidation and little composition change. XPS of the layers after $N_2$ surface activation, bonding to thin glass, annealing at 700° C. for 10 minutes in $N_2$, and de-bonding to expose the diphenylsilicon surface in two of three locations sampled is similar to that of the $N_2$ treated DPS surface as shown in Table 6. Nitrogen concentration is about half. These results are consistent with de-bonding occurring by an adhesive failure at the nitrogen treated surface. In the remaining location, XPS suggests some bare EXG glass is exposed suggesting part of the thin DPS surface modification tore away during de-bonding.

Table 8 below shows the elastic modulus ("E") and hardness ("H") of 1.1 um thick films of phenylsilicon, methylphenylsilicon and diphenylsilicon as measured by nanoindentation.

TABLE 8

|  | E, GPa | H, GPa |
|---|---|---|
| phenylsilicon | 16.7 | 2.3 |
| diphenylsilicon | 16.1 | 2.7 |
| methylphenylsilicon | 21 | 3.8 |

As shown, the elastic modulus measured for the modification layers is about ten times more than typical polymers such as polyimides, one quarter that of common display glass and significantly less than the 134 GPa modulus of amorphous silicon (R. Kuschnereit, H. Fath, A. A. Kolomenskii, M. Szabadi, P. Hess, Mechanical and elastic properties of amorphous hydrogenated silicon films studied by broadband surface acoustic wave spectroscopy, Applied Physics A 1995 (61) 3 269-276.) This is consistent with the expected structure and suggests limited compliance of the bonding layer.

The use of a surface modification layer 30, together with bonding surface preparation as appropriate, can achieve a controlled bonding area, that is, a bonding area capable of providing a room-temperature bond between sheet 20 and sheet 10 sufficient to allow the article 2 to be processed in FPD type processes (including vacuum and wet processes), and yet one that controls covalent bonding between sheet 20 and sheet 10 (even at elevated temperatures) so as to allow the sheet 20 to be removed from sheet 10 (without damage to the sheets) after high temperature processing of the article 2, for example, FPD type processing or LTPS processing. To evaluate potential bonding surface preparations, and modification layers with various bonding energies, that would provide a reusable carrier suitable for FPD processing, a series of tests were used to evaluate the suitability of each. Different FPD applications have different requirements, but LTPS and Oxide TFT processes appear to be the most stringent at this time. Thus, tests representative of steps in these processes were chosen, as these are desired applications for the article 2. Annealing at 400° C. is used in oxide TFT processes, whereas crystallization and dopant activation steps over 600° C. are used in LTPS processing. Accordingly, the following testing was carried out to evaluate the likelihood that a particular bonding surface preparation and modification layer 30 would allow a thin sheet 20 to remain bonded to a carrier 10 throughout FPD processing, while allowing the thin sheet 20 to be removed from the carrier 10 (without damaging the thin sheet 20 and/or the carrier 10) after such processing (including processing at temperatures ≥400° C. to 750° C.).

Thermal Testing of Bond Energy

The bonding energy of the modification layers to thin glass sheets was further tested under heating conditions. For example, after surface activation, thin glass was observed to bond very well to phenylsilicon, methylphenylsilicon, and diphenylsilicon modification layer bonding surfaces with a very high bond speed consistent with the high surface energy. And high bond speed has a manufacturing advantage of reducing the overall processing time, and/or increasing the throughput, to produce article 2. Thus, initial surface energies that promote rapid bond speeds are advantageous.

Figure 5:
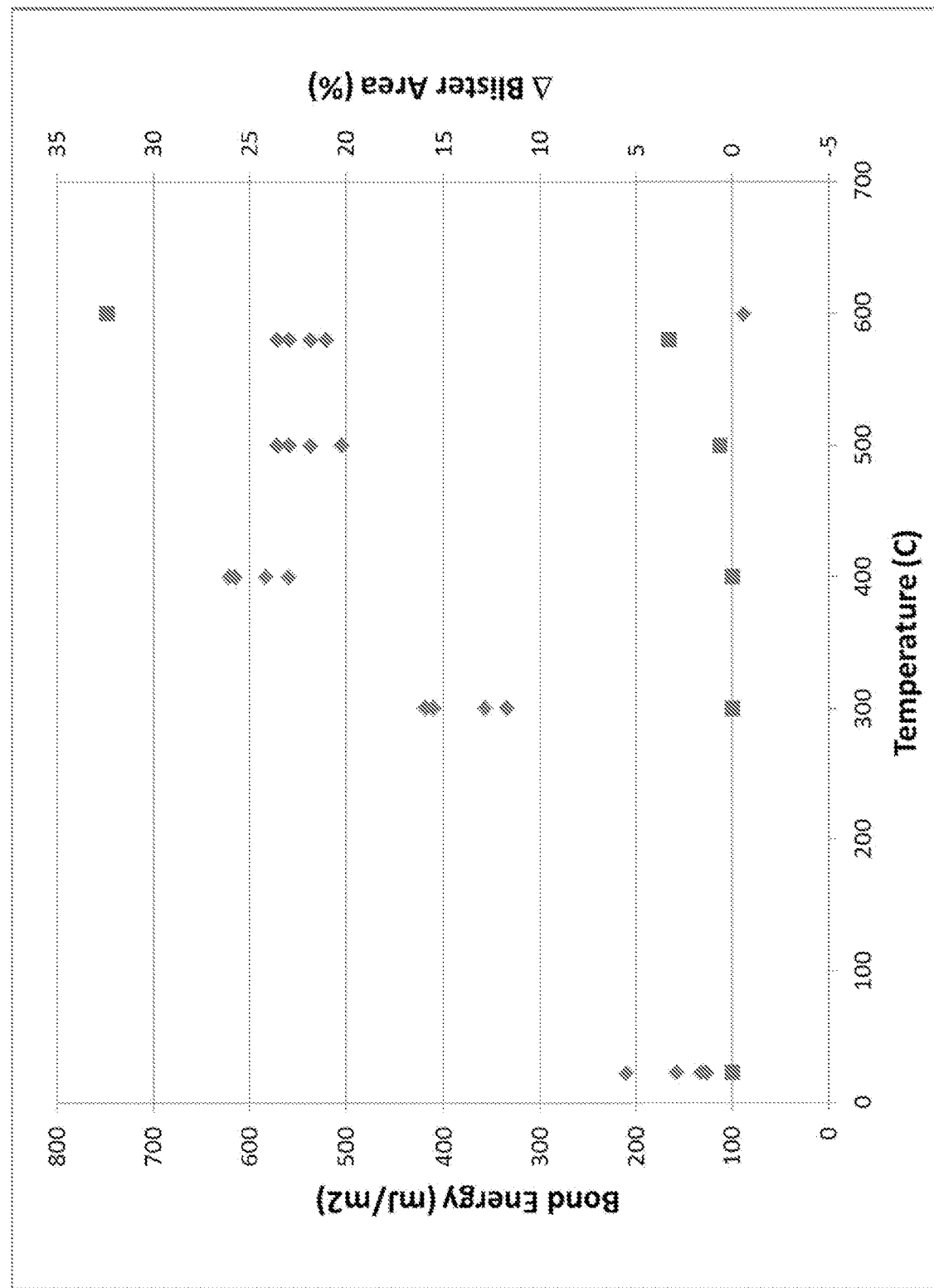
FIG. 5 is a graph of the bond energy and change in percent blister area for thin glass bonded to phenylsilicon layers having a thickness of 250 nm. The phenylsilicon layers were plasma treated with nitrogen prior to bonding the thin glass thereto.
Figure 6:
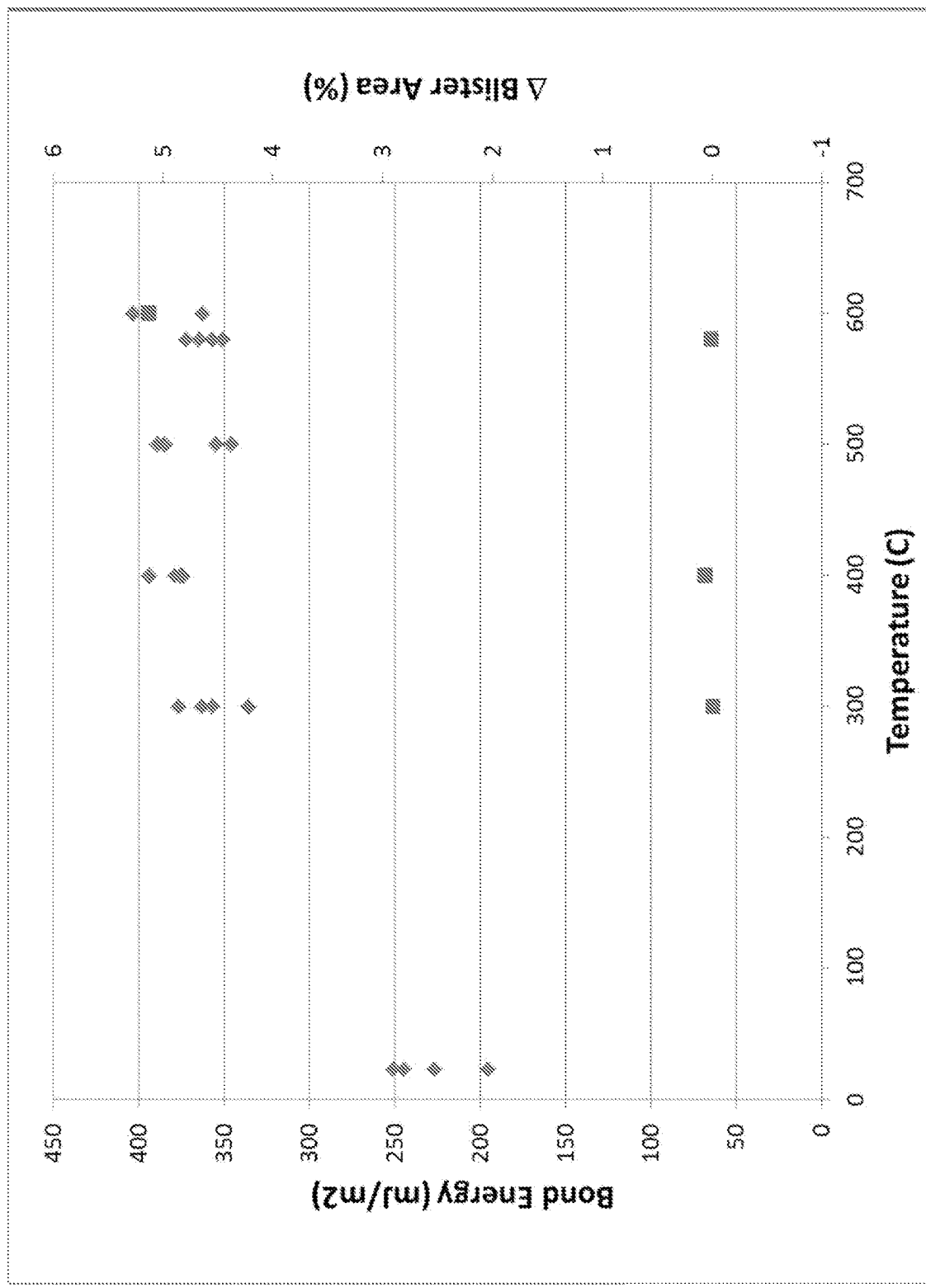
FIG. 6 is a graph of the bond energy and change in percent blister area for thin glass bonded to methylphenylsilicon layers having a thickness of 100 nm. The phenylsilicon layers were plasma treated with nitrogen prior to bonding the thin glass thereto.
Figure 7:
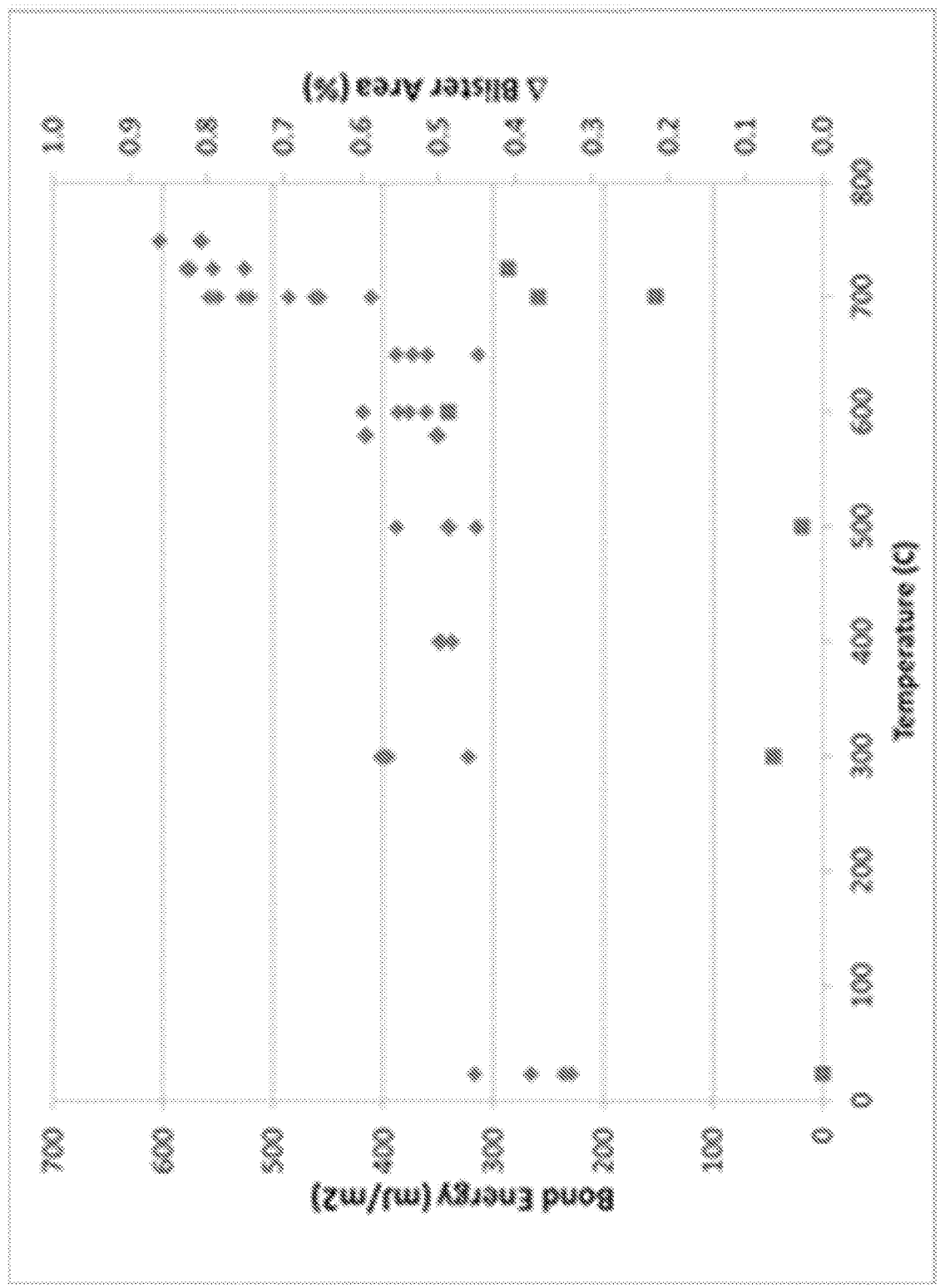
FIG. 7 is a graph of the bond energy and change in percent blister area for thin glass bonded to diphenylsilicon layers having a thickness of 30 nm. The diphenylsilicon layers were plasma treated with nitrogen prior to bonding the thin glass thereto.

FIGS. 5, 6, and 7, show the evolution of bond energy and change in blister area for thin glass bonded to Corning® Eagle XG® or Lotus XT carriers coated with nitrogen treated phenylsilicon (i.e. FIG. 5), methylphenylsilicon (i.e. FIG. 6) and diphenylsilicon (i.e. FIG. 7). The bond energy data points in the figures are indicated with a diamond shaped marker with the scale on the left-hand Y-axis, whereas the change in percent blister area is shown by square data points with the scale on the right-hand Y-axis. The bond energy of thin glass bonded with nitrogen treated phenylsilicon layer having a thickness of 250 nm rises to about 600 $mJ/m^2$ at 400° C., and remains near that value until excessive blistering is observed at 600° C. Thus, the phenylsilicon surface modification layer consistently maintains a bond energy less than about 600 $mJ/m^2$ with the thin glass sheet up to 600° C., i.e., after holding the glass article at 600° C. for 10 minutes in an inert atmosphere.

Similar results are observed for methylphenylsilicon (FIG. 6) with the bond energy of thin glass bonded with nitrogen treated methylphenylsilicon near 400 $mJ/m^2$ from 300-600° C., with excessive blistering observed at 600° C. Thus, the methylphenylsilicon surface modification layer consistently maintains a bond energy less than about 400 $mJ/m^2$ (certainly less than 450 $mJ/m^2$) with the thin glass sheet up to 600° C., i.e., after holding the glass article at 600° C. for 10 minutes in an inert atmosphere.

As shown in FIG. 7, the nitrogen treated diphenylsilicon layer exhibits excellent bonding energy with a thin glass sheet, for example, the bond energy remains near 400 mJ/m$^2$ (certainly less than 450 mJ/m$^2$) up to 650° C., i.e., after holding the glass article at 650° C. for 10 minutes in an inert atmosphere. Up to 750° C., the diphenylsilicon layer consistently exhibited a bonding energy less than about 600 mJ/m$^2$. Higher temperature evaluation above 750° C. was not possible due to softening of the thin glass which had a composition consistent with Corning® EAGLE XG® glass (available from Corning Incorporated, having offices in Corning N.Y.).

The foregoing results show that each an N$_2$ treated phenylsilicon, N$_2$ treated methylphenylsilicon, and N$_2$ treated diphenylsilicon surface modification layer is sufficiently thermally stable to 600° C. and above for LPTS processing with a final bond energy less than 600 mJ/m$^2$.

Outgassing of the Modification Layer

Polymer adhesives used in typical wafer bonding applications are generally 10-100 microns thick and lose about 5% of their mass at or near their temperature limit. For such materials, evolved from thick polymer films, it is easy to quantify the amount of mass loss, or outgassing, by mass-spectrometry. On the other hand, it is more challenging to measure the outgassing from thin surface treatments that are on the order of 10 to 100 nm thick or less, for example the plasma polymer surface modification layers described above, as well as for a thin layer of pyrolyzed silicone oil or self-assembled monolayers. For such materials, mass-spectrometry is not sensitive enough. There are a number of other ways to measure outgassing, however.

Figure 8:
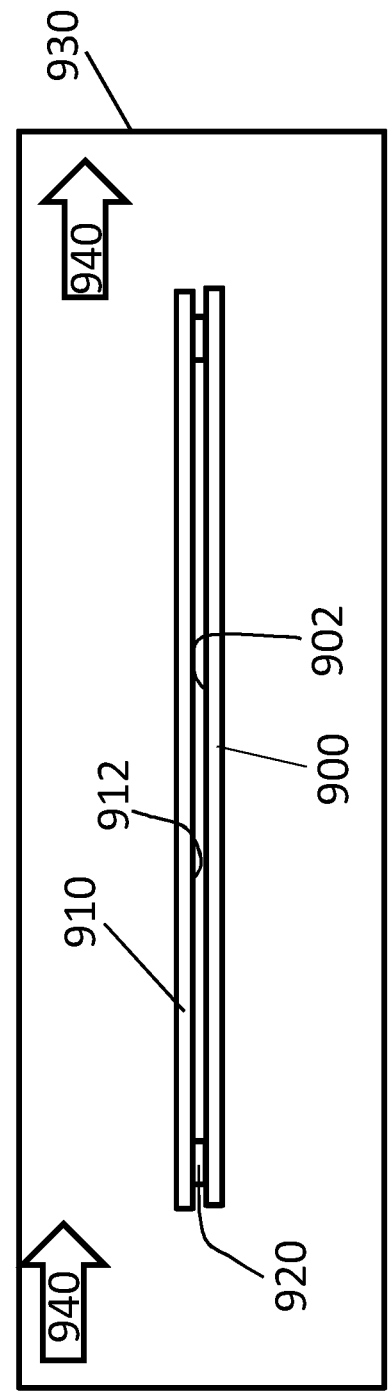
FIG. 8 is a schematic view of a testing setup.

A first manner, TEST #1, of measuring small amounts of outgassing is based on surface energy measurements, and will be described with reference to FIG. 8. To carry out this test, a setup as shown in FIG. 8 may be used. A first substrate, or carrier, 900 having the to-be-tested modification layer thereon presents a surface 902, i.e., a modification layer corresponding in composition and thickness to the modification layer 30 to be tested. A second substrate, or cover, 910 is placed so that its surface 912 is in close proximity to the surface 902 of the carrier 900, but not in contact therewith. The surface 912 is an uncoated surface, i.e., a surface of bare material from which the cover is made. Spacers 920 are placed at various points between the carrier 900 and cover 910 to hold them in spaced relation from one another. The spacers 920 should be thick enough to separate the cover 910 from the carrier 900 to allow a movement of material from one to the other, but thin enough so that during testing the amount of contamination from the chamber atmosphere on the surfaces 902 and 912 is minimized. The carrier 900, spacers 920, and cover 910, together form a test article 901.

Figure 9:
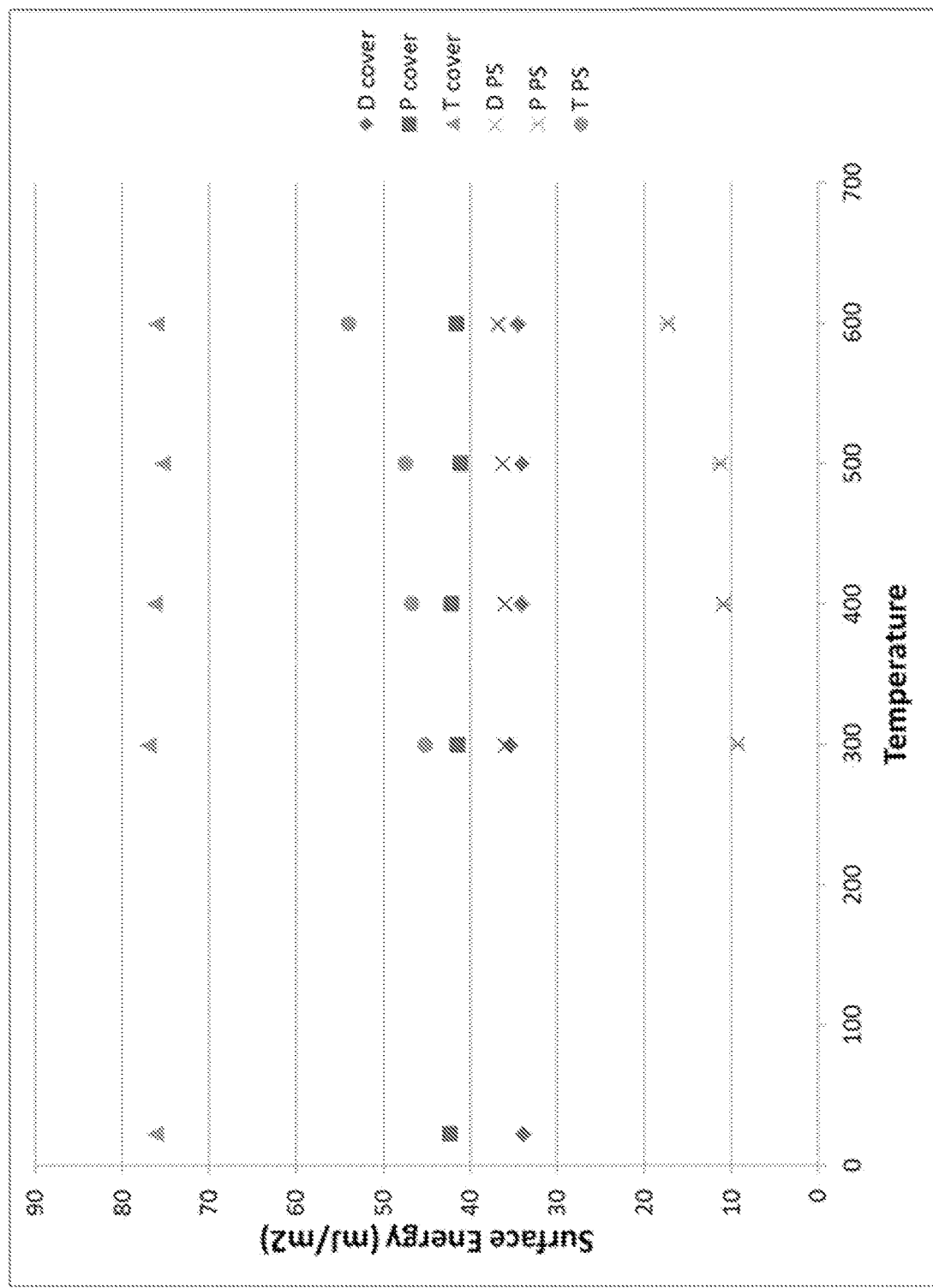
FIG. 9 is a graph of the surface energy for phenylsilicon layers having a thickness of 250 nm plasma deposited on a glass carrier, and for cover wafers in a test setup according to FIG. 8.
Figure 10:
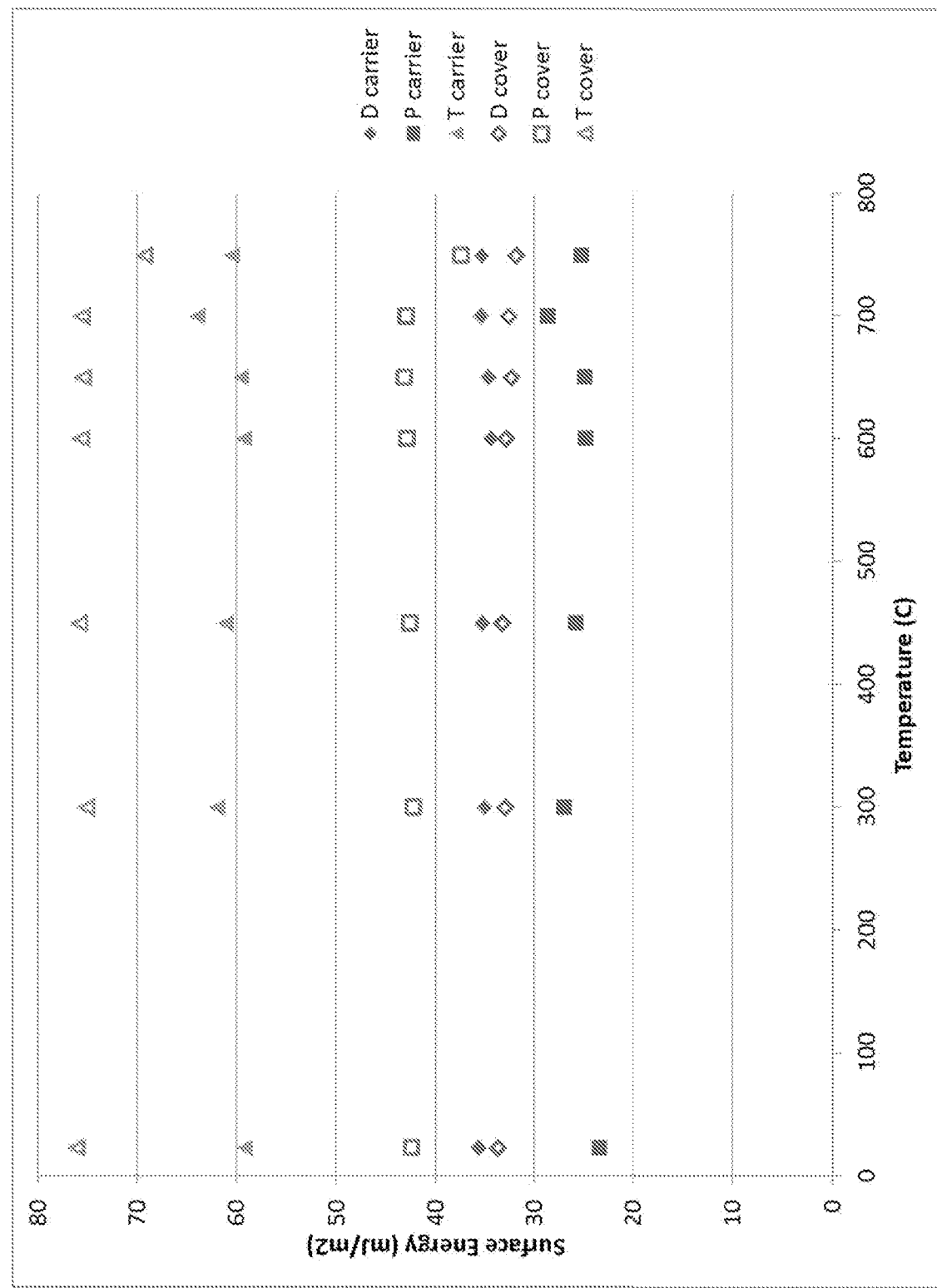
FIG. 10 is a graph of the surface energy phenylsilicon layers having a thickness of 37 nm plasma deposited on a glass carrier, and for cover wafers in a test setup according to FIG. 8.

Prior to assembly of the test article 901, the surface energy of bare surface 912 is measured, as is the surface energy of the surface 902, i.e., the surface of carrier 900 having the modification layer provided thereon. The surface energies as shown in FIGS. 9 and 10, wherein total, polar, and dispersion, components, were measured by fitting a theoretical model developed by S. Wu (1971) to three contact angles of three test liquids; water, diiodomethane and hexadecane. (Reference: S. Wu, J. Polym. Sci. C, 34, 19, 1971).

After assembly, the test article 901 is placed into a heating chamber 930, and is heated through a time-temperature cycle. The heating is performed at atmospheric pressure and under flowing N$_2$ gas, i.e., flowing in the direction of arrows 940 at a rate of 2 standard liters per minute.

During the heating cycle, changes in the surface 902 (including changes to the surface modification layer due to evaporation, pyrolysis, decomposition, polymerization, reaction with the carrier, and de-wetting, for example) are evidenced by a change in the surface energy of surface 902. A change in the surface energy of surface 902 by itself does not necessarily mean that the surface modification layer has outgassed, but does indicate a general instability of the surface modification layer material at that temperature as its character is changing due to the mechanisms noted above, for example. Thus, the less the change in surface energy of surface 902, the more stable the modification layer. On the other hand, because of the close proximity of the surface 912 to the surface 902, any material outgassed from surface 902 will be collected on surface 912 and will change the surface energy of surface 912.

Accordingly, the change in surface energy of surface 912 is a proxy for outgassing of the modification layer present on surface 902.

Thus, one test for outgassing uses the change in surface energy of the cover surface 912. Specifically, if there is a change in surface energy—of surface 912—of ≥10 mJ/m$^2$, then outgassing may be indicated. Changes in surface energy of this magnitude are consistent with contamination which can lead to loss of film adhesion or degradation in material properties and device performance. A change in surface energy of ≤5 mJ/m$^2$ is close to the repeatability of surface energy measurements and inhomogeneity of the surface energy. This small change is consistent with minimal outgassing.

During testing that produced the results in FIGS. 9 and 10, the carrier 900, the cover 910, and the spacers 920, were made of Corning® Eagle XG® glass, an alkali-free alumino-boro-silicate display-grade glass available from Corning Incorporated, Corning, N.Y., although such need not be the case. The carrier 900 and cover 910 were 150 mm diameter 0.63 mm thick. Generally, the carrier 910 and cover 920 will be made of the same material as carrier 10 and thin sheet 20, respectively, for which an outgassing test is desired. During this testing, silicon spacers 0.63 mm thick, 2 mm wide, and 8 cm long, were positioned between surfaces 902 and 912, thereby forming a gap of 0.63 mm between surfaces 902 and 912. During this testing, the chamber 930 was incorporated in MPT-RTP600s rapid thermal processing equipment. The temperature of the chamber was cycled from room temperature to the test limit temperature at a rate of 9.2° C. per minute, held at the test limit temperature for 10 minutes, and then cooled at furnace rate to 200° C. After the chamber 930 had cooled to 200° C., the test article was removed. After the test article had cooled to room temperature, the surface energies of each surface 902 and 912 were again measured. Thus, by way of example, using the data for the change in surface energy, tested to a limit temperature of 600° C., for phenylsilicon (FIG. 9), the triangular data points represent total surface energy of the cover, the square data points represent the polar component of surface energy for the cover, the diamond data points represent the dispersion component of surface energy for the cover, the circle data points represent the total surface energy of the phenylsilicon-coated carrier, the X data points represent the dispersion component of the phenylsilicon-coated carrier, and the pipe-X data points represent the polar component of the phenylsilicon-coated carrier. The triangular data point at about 25° C. (room temperature) shows a surface energy of 75 mJ/m$^2$ (milli-Joules per square meter), and is the surface energy of the bare glass cover, i.e., there has been no time-temperature cycle yet run whereby there has been no deposition of outgassed material yet collected on the cover. As outgassed material is collected on the cover, the surface energy of the cover will decrease. A decrease in surface energy of the cover of more than 10 mJ/m$^2$ is indicative of outgassing from the surface modification material on surface 104. The data points at 300° C. indicate the surface energy as measured after a time-temperature cycle performed as follows: the article 901 (having phenylsilicon used as a modification layer on the carrier 900 to present surface 902) was placed in a heating chamber 930 at room temperature, and atmospheric pressure; the chamber was heated to a test-limit temperature of 300° C. at a rate of 9.2° C. per minute, with a N$_2$ gas flow at two standard liters per minute, and held at the test-limit temperature of 300° C. for 10 minutes; the chamber was then allowed to cool to 300° C. at a rate of 1° C. per minute, and the article 901 was then removed from the chamber 930; the article was then allowed to cool to room temperature (without N$_2$ flowing atmosphere); the surface energy of surface 912 was then measured and plotted as the points (triangle, square, diamond) for 300° C. The remaining data points (triangle, square, diamond) for 250 nm thick phenylsilicon (FIG. 9, for 400° C., 500° C., and 600° C.), as well as the data points (open triangle, open square, and open diamond) for 37 nm thick phenylsilicon (FIG. 10), were then determined in a similar manner. The data points (circle, X, pipe-X in FIG. 9) representing surface energy of surface 902 for the 250 nm thick phenylsilicon modification layer, and the data points (filled triangle, filled square, and filled diamond in FIG. 10) representing surface energy of surface 902 for a 37 nm thick phenylsilicon modification layer, were determined in a similar manner.

From FIG. 9, triangular data points, it can be seen that the total surface energy of the cover 912 remained about constant at 75 mJ/m$^2$, indicating that no material was collected on cover 912, and consistent with no outgassing from surface 902. Similarly, over the range of from 300° C. to 600° C., the total surface energy of the phenylsilicon modification layer (circular data points) changed less than about 10 mJ/m$^2$, consistent with minimal material loss and indicating that the modification layer is very stable.

From FIG. 10, open triangular data points, it can be seen that the total surface energy of the cover 912 remained about constant at about 75 mJ/m$^2$ (dipping only slightly at 750° C.), up to about 750° C., indicating that minimal material was collected on cover 912, and consistent with no outgassing from surface 902. Similarly, over the range of from room temperature to 750° C., the total surface energy of the phenylsilicon modification layer (filled triangular data points) changed less than about 10 mJ/m$^2$, consistent with minimal material loss and indicating that the modification layer is very stable.

A Second manner, TEST #2, of measuring small amounts of outgassing is based on an assembled article, i.e., one in which a thin glass sheet is bonded to a glass carrier via a organosilicon modification layer, and uses a change in percent bubble area to determine outgassing. During heating of the glass article, bubbles formed between the carrier and the thin sheet that indicate outgassing of the modification layer. The outgassing under the thin sheet may be limited by strong adhesion between the thin sheet and carrier. Nonetheless, layers ≤10 nm thick (plasma polymerized materials, SAMs, and pyrolyzed silicone oil surface treatments, for example) may still create bubbles during thermal treatment, despite their smaller absolute mass loss. And the creation of bubbles between the thin sheet and carrier may cause problems with pattern generation, photolithography processing, and/or alignment during device processing onto the thin sheet. Additionally, bubbling at the boundary of the bonded area between the thin sheet and the carrier may cause problems with process fluids from one process contaminating a downstream process. A change in % bubble area of ≥5 is significant, indicative of outgassing, and is not desirable. On the other hand a change in % bubble area of ≤1 is insignificant and an indication that there has been no outgassing.

The average bubble area of bonded thin glass in a class 1000 clean room with manual bonding is about 1%. The % bubbles in bonded carriers is a function of cleanliness of the carrier, thin glass sheet, and surface preparation. Because these initial defects act as nucleation sites for bubble growth after heat treatment, any change in bubble area upon heat treatment less than 1% is within the variability of sample preparation. To carry out this test, a commercially available desktop scanner with transparency unit (Epson Expression 10000XL Photo) was used to make a first scan image of the area bonding the thin sheet and carrier immediately after bonding. The parts were scanned using the standard Epson software using 508 dpi (50 micron/pixel) and 24 bit RGB. The image processing software first prepares an image by stitching, as necessary, images of different sections of a sample into a single image and removing scanner artifacts (by using a calibration reference scan performed without a sample in the scanner). The bonded area is then analyzed using standard image processing techniques such as thresholding, hole filling, erosion/dilation, and blob analysis. The Epson Expression 11000XL Photo may also be used in a similar manner. In transmission mode, bubbles in the bonding area are visible in the scanned image and a value for bubble area can be determined. Then, the bubble area is compared to the total bonding area (i.e., the total overlap area between the thin sheet and the carrier) to calculate a % area of the bubbles in the bonding area relative to the total bonding area. The samples are then heat treated in a MPT-RTP600s Rapid Thermal Processing system under N$_2$ atmosphere at test-limit temperatures of 300° C., 400° C., 500° C. and 600° C., for up to 10 minutes. In certain examples, as shown in FIG. 7, the samples were heat treated up to temperatures of 700° C. and 750° C. Specifically, the time-temperature cycle carried out included: inserting the article into the heating chamber at room temperature and atmospheric pressure; the chamber was then heated to the test-limit temperature at a rate of 9° C. per minute; the chamber was held at the test-limit temperature for 10 minutes; the chamber was then cooled at furnace rate to 200° C.; the article was removed from the chamber and allowed to cool to room temperature; the article was then scanned a second time with the optical scanner. The % bubble area from the second scan was then calculated as above and compared with the % bubble area from the first scan to determine a change in % bubble area (A Blister Area (%)). As noted above, a change in bubble area of ≥5% is significant and an indication of outgassing. A change in % bubble area was selected as the measurement criterion because of the variability in original % bubble area. That is, most surface modification layers have a bubble area of about 2% in the first scan due to handling and cleanliness after the thin sheet and carrier have been prepared and before they are bonded. However, variations may occur between materials.

The % bubble area measured, as exemplified by the change in percent bubble area, can also be characterized as the percent of total surface area of the modification layer bonding surface not in contact with the first sheet 20 bonding surface 24. As described above, the percent of total surface area of the modification layer bonding surface not in contact with the first sheet is desirably less than 5%, less than 3%, less than 1% and up to less than 0.5% after the glass article is subjected to a temperature cycle by heating in a chamber cycled from room temperature to 500° C., 600° C., 650° C., 700° C. and up to 750° C. at a rate in the range of from about 400 to about 600° C. per minute and then held at the test temperature for 10 minutes before allowing the glass article to cool to room temperature. The modification layer described herein allows the first sheet to be separated from the second sheet without breaking the first sheet into two or more pieces after the glass article is subjected to the above temperature cycling and thermal testing.

The results of the outgassing test are shown in FIGS. 5, 6 and 7 in which blistering data is shown as square data points, and is graphed with the scale as shown on the right-hand Y-axis. FIG. 5 shows blistering data for a 250 nm thick phenylsilicon surface modification layer after $N_2$ plasma treatment and prior to bonding with a thin glass sheet. The phenylsilicon layer exhibited less than 5% change in bubble area up to about 600° C., which is consistent with no outgassing, but which rapidly increased above 600° C. However, up to 500° C., the phenylsilicon layer exhibited less than 1% change in bubble area, again consistent with no outgassing. Also, as shown by the diamond data points graphed with the scale on the left-hand Y-axis, the phenylsilicon surface modification layer provides bonding to thin glass up to 600° C. at a bonding energy less than about 600 mJ/m$^2$, which permits debonding of the thin glass from the carrier without causing significant damage to the thin glass sheet.

FIG. 6 shows blistering data for a 100 nm thick methylphenylsilicon surface modification layer after $N_2$ plasma treatment and prior to bonding with a thin glass sheet. The methylphenylsilicon layer exhibited less than 1% change in bubble area up to about 600° C., which is consistent with no outgassing, but which rapidly increased at a temperature above about 600° C. Also, as shown by the diamond data points graphed with the scale on the left-hand Y-axis, the methylphenylsilicon modification layer provides bonding to thin glass up to 600° C. at a bonding energy less than 400 mJ/m$^2$, which permits debonding of the thin glass from the carrier without causing significant damage to the thin glass sheet.

FIG. 7 shows blistering data for a 30 nm thick diphenylsilicon modification layer after $N_2$ plasma treatment and prior to bonding with a thin glass sheet. The diphenylsilicon layer exhibited less than 0.5% change in bubble area at a temperature up to about 700° C. and slightly above, which is consistent with no outgassing. Up to 500° C., the diphenylsilicon layer exhibited less than 0.1% change in bubble area, again, consistent with no outgassing. Also, as shown by the diamond data points graphed with the scale on the left-hand Y-axis, the diphenylsilicon modification layer provides bonding to thin glass up to at least 750° C. at a bonding energy less than about 600 mJ/m$^2$, and up to 650° C. at a bonding energy less than 450 mJ/m$^2$, which permits debonding of the thin glass from the carrier without causing significant damage to the thin glass sheet.

It will be apparent to those skilled in the art that various modifications and variations can be made to the embodiments described herein without departing from the spirit and scope of the principles described herein. Thus, it is intended that the scope of the present description cover the modifications and variations that come within the scope of the appended claims and their equivalents.

For example, although the surface modification layer was described as being initially deposited onto the sheet 10 (for example a carrier), such need not be the case. Instead, or in addition, the surface modification layer may be disposed on sheet 20 (for example a thin sheet).

Further, for example, although the surface modification layer was described as being one layer, it may be comprised of any suitable number of layers, for example, two, three, four, or five. In the case where the surface modification layer has more than one layer, the layer in contact with the bonding surface of sheet 10 (for example a carrier) need not be the same composition as the layer in contact with the bonding surface of the sheet 20 (for example a thin sheet).

What is claimed is:

1. An article comprising:
   a first sheet comprising a first sheet bonding surface;
   a second sheet comprising a second sheet bonding surface;
   a modification layer comprising a modification layer bonding surface, the modification layer comprising organosilicon; and
   the modification layer bonding surface being in contact with the first sheet bonding surface, and the second sheet bonding surface being coupled with the first sheet bonding surface with the modification layer therebetween,
   wherein the first sheet bonding surface is bonded with the modification layer bonding surface with a bond energy of less than 600 mJ/m$^2$ after holding the article at 600° C. for 10 minutes in a nitrogen atmosphere;
   wherein the modification layer is a polymerized amorphous organosilicon which is selected from the group consisting of: phenylsilicon, methylphenylsilicon, diphenylsilicon, methlydiphenylsilicon, triphenylsilicon, and a combination thereof; and
   the polymerized amorphous organosilicon has a thickness in the range of 5 nm to 10 microns.

2. The article of claim 1, the first sheet bonding surface being bonded with the modification layer bonding surface with a bond energy of less than 600 mJ/m$^2$ after holding the article at 700° C. for 10 minutes in a nitrogen atmosphere.

3. The article of claim 1, the modification layer comprising a thickness in the range of 10 nm to 500 nm.

4. The article of claim 1, the modification layer bonding surface comprising an atomic percent ratio of oxygen to silicon in the range of 1 to 3 and an atomic percent ratio of nitrogen to silicon in the range of 0.5 to 1.5, wherein the atomic percent of silicon, oxygen and nitrogen is measured from the modification layer bonding surface after the modification layer bonding surface is exposed to nitrogen containing reactant to increase the surface energy of the modification layer bonding surface to a range of 55 to 75 mJ/m$^2$.

5. The article of claim 1, the modification layer bonding surface comprising an atomic percent ratio of oxygen to silicon in the range of 1 to 3 and an atomic percent ratio of nitrogen to silicon in the range of 2.5 to 6.5, wherein the atomic percent of silicon, oxygen and nitrogen is measured from the modification layer bonding surface after the article is held at 700° C. for 10 minutes in nitrogen containing reactant and then the first sheet is separated from the second sheet after the article is cooled to room temperature.

6. The article of claim 1, the change in percent of blister area is less than 1 percent after the article is subjected to a temperature cycle by heating in a chamber cycled from room temperature to 700° C. at a rate of 600° C. per minute and held at 700° C. for 10 minutes before allowing the article to cool to room temperature.

7. The article of claim 1, wherein the first sheet may be separated from the second sheet without breaking the first sheet into two or more pieces after the article is subjected to a temperature cycle by heating in a chamber cycled from room temperature to 700° C. at a rate of 600° C. per minute and held at 700° C. for 10 minutes before allowing the article to cool to room temperature.

8. The article of claim 1, the first sheet being glass comprising a thickness of 300 microns or less, and the second sheet being glass comprising a thickness of 300 microns or greater.

9. The article of claim 1, the modification layer comprising a thickness in the range of 100 nm to 250 nm thick.

10. The article of claim 1, the modification layer comprising a thickness in the range of 500 nm to 1 μm thick.

11. The article of claim 1, the modification layer comprises a coverage of from 10% to 100% of the bonding surface.

12. The article of claim 1, the modification layer comprises a coverage of from 20% to 90% of the bonding surface.

13. The article of claim 1, the modification layer comprises a coverage of from 50% to 90% of the bonding surface.

14. An article comprising:
a first sheet comprising a first sheet bonding surface;
a second sheet comprising a second sheet bonding surface;
a modification layer comprising a modification layer bonding surface comprising an atomic percent ratio of oxygen to silicon in the range of 1 to 3 and an atomic percent ratio of nitrogen to silicon in the range of 0.5 to 1.5, wherein the atomic percent of silicon, oxygen and nitrogen is measured from the modification layer bonding surface after the modification layer bonding surface is exposed to nitrogen containing reactant to increase the surface energy of the modification layer bonding surface to a range of 55 to 75 mJ/m$^2$, wherein the modification layer comprises organosilicon; and
the modification layer bonding surface being in contact with the first sheet bonding surface, and the second sheet bonding surface being coupled with the first sheet bonding surface with the modification layer therebetween,
wherein the first sheet bonding surface is bonded with the modification layer bonding surface with a bond energy of less than 600 mJ/m$^2$ after holding the article at 600° C. for 10 minutes in a nitrogen atmosphere;
wherein the modification layer is a polymerized amorphous organosilicon and has a thickness in the range of 5 nm to 10 microns.

15. The article of claim 14, the first sheet bonding surface being bonded with the modification layer bonding surface with a bond energy of less than 600 mJ/m$^2$ after holding the article at 700° C. for 10 minutes in a nitrogen atmosphere.

16. The article of claim 14, the modification layer comprising a thickness in the range of 10 nm to 500 nm.

17. The article of claim 14, the polymerized amorphous organosilicon comprises at least one of: phenylsilicon, methylphenylsilicon, diphenylsilicon, methlydiphenylsilicon, triphenylsilicon, and a combination thereof.

18. The article of claim 14, the change in percent of blister area is less than 1 percent after the article is subjected to a temperature cycle by heating in a chamber cycled from room temperature to 700° C. at a rate of 600° C. per minute and held at 700° C. for 10 minutes before allowing the article to cool to room temperature.

19. The article of claim 14, wherein the first sheet may be separated from the second sheet without breaking the first sheet into two or more pieces after the article is subjected to a temperature cycle by heating in a chamber cycled from room temperature to 700° C. at a rate of 600° C. per minute and held at 700° C. for 10 minutes before allowing the article to cool to room temperature.

20. The article of claim 14, the first sheet being glass comprising a thickness of 300 microns or less, and the second sheet being glass comprising a thickness of 300 microns or greater.

21. The article of claim 14, the modification layer comprising a thickness in the range of 100 nm to 250 nm thick.

22. The article of claim 14, the modification layer comprising a thickness in the range of 500 nm to 1 μm thick.

23. The article of claim 14, the modification layer comprises a coverage of from 10% to 100% of the bonding surface.

24. The article of claim 14, the modification layer comprises a coverage of from 20% to 90% of the bonding surface.

25. The article of claim 14, the modification layer comprises a coverage of from 50% to 90% of the bonding surface.

26. An article comprising:
a first sheet comprising a first sheet bonding surface;
a second sheet comprising a second sheet bonding surface;
a modification layer comprising a modification layer bonding surface, the modification layer bonding surface comprising an atomic percent ratio of oxygen to silicon in the range of 1 to 3 and an atomic percent ratio of nitrogen to silicon in the range of 2.5 to 6.5, wherein the atomic percent of silicon, oxygen and nitrogen is measured from the modification layer bonding surface after the article is held at 700° C. for 10 minutes in nitrogen containing reactant and then the first sheet is separated from the second sheet after the article is cooled to room temperature, further wherein the modification layer comprises organosilicon; and
the modification layer bonding surface being in contact with the first sheet bonding surface, and the second sheet bonding surface being coupled with the first sheet bonding surface with the modification layer therebetween,
wherein the first sheet bonding surface is bonded with the modification layer bonding surface with a bond energy of less than 600 mJ/m$^2$ after holding the article at 600° C. for 10 minutes in a nitrogen atmosphere;
wherein the modification layer is a polymerized amorphous organosilicon and has a thickness in the range of 5 nm to 10 microns.

27. The article of claim 26, the first sheet bonding surface being bonded with the modification layer bonding surface with a bond energy of less than 600 mJ/m$^2$ after holding the article at 700° C. for 10 minutes in a nitrogen atmosphere.

28. The article of claim 26, the modification layer comprising a thickness in the range of 10 nm to 500 nm.

29. The article of claim 26, the polymerized amorphous organosilicon comprises at least one of: phenylsilicon, methylphenylsilicon, diphenylsilicon, methlydiphenylsilicon, triphenylsilicon, and a combination thereof.

30. The article of claim 26, the change in percent of blister area is less than 1 percent after the article is subjected to a temperature cycle by heating in a chamber cycled from room temperature to 700° C. at a rate of 600° C. per minute and held at 700° C. for 10 minutes before allowing the article to cool to room temperature.

31. The article of claim 26, wherein the first sheet may be separated from the second sheet without breaking the first sheet into two or more pieces after the article is subjected to a temperature cycle by heating in a chamber cycled from room temperature to 700° C. at a rate of 600° C. per minute and held at 700° C. for 10 minutes before allowing the article to cool to room temperature.

32. The article of claim 26, the first sheet being glass comprising a thickness of 300 microns or less, and the second sheet being glass comprising a thickness of 300 microns or greater.

33. The article of claim 26, the modification layer comprising a thickness in the range of 100 nm to 250 nm thick.

34. The article of claim 26, the modification layer comprising a thickness in the range of 500 nm to 1 μm thick.

35. The article of claim 26, the modification layer comprises a coverage of from 10% to 100% of the bonding surface.

36. The article of claim 26, the modification layer comprises a coverage of from 20% to 90% of the bonding surface.

37. The article of claim 26, the modification layer comprises a coverage of from 50% to 90% of the bonding surface.

38. An article comprising:
   a first sheet comprising a first sheet bonding surface;
   a second sheet comprising a second sheet bonding surface;
   a modification layer having a thickness in the range of 100 nm to 250 nm thick, the modification layer comprising a modification layer bonding surface, the modification layer comprising organosilicon and; and
   the modification layer bonding surface being in contact with the first sheet bonding surface, and the second sheet bonding surface being coupled with the first sheet bonding surface with the modification layer therebetween,
   wherein the first sheet bonding surface is bonded with the modification layer bonding surface with a bond energy of less than 600 mJ/m$^2$ after holding the article at 600° C. for 10 minutes in a nitrogen atmosphere;
   wherein the modification layer is a polymerized amorphous organosilicon.

39. The article of claim 38, the first sheet bonding surface being bonded with the modification layer bonding surface with a bond energy of less than 600 mJ/m$^2$ after holding the article at 700° C. for 10 minutes in a nitrogen atmosphere.

40. The article of claim 38, the polymerized amorphous organosilicon comprises at least one of: phenylsilicon, methylphenylsilicon, diphenylsilicon, methlydiphenylsilicon, triphenylsilicon, and a combination thereof.

41. The article of claim 38, wherein the modification layer bonding surface comprises an atomic percent ratio of oxygen to silicon in the range of 1 to 3 and an atomic percent ratio of nitrogen to silicon in the range of 0.5 to 1.5, wherein the atomic percent of silicon, oxygen and nitrogen is measured from the modification layer bonding surface after the modification layer bonding surface is exposed to nitrogen containing reactant to increase the surface energy of the modification layer bonding surface to a range of 55 to 75 mJ/m$^2$.

42. The article of claim 38, the modification layer bonding surface comprising an atomic percent ratio of oxygen to silicon in the range of 1 to 3 and an atomic percent ratio of nitrogen to silicon in the range of 2.5 to 6.5, wherein the atomic percent of silicon, oxygen and nitrogen is measured from the modification layer bonding surface after the article is held at 700° C. for 10 minutes in nitrogen containing reactant and then the first sheet is separated from the second sheet after the article is cooled to room temperature.

43. The article of claim 38, the change in percent of blister area is less than 1 percent after the article is subjected to a temperature cycle by heating in a chamber cycled from room temperature to 700° C. at a rate of 600° C. per minute and held at 700° C. for 10 minutes before allowing the article to cool to room temperature.

44. The article of claim 38, wherein the first sheet may be separated from the second sheet without breaking the first sheet into two or more pieces after the article is subjected to a temperature cycle by heating in a chamber cycled from room temperature to 700° C. at a rate of 600° C. per minute and held at 700° C. for 10 minutes before allowing the article to cool to room temperature.

45. The article of claim 38, the first sheet being glass comprising a thickness of 300 microns or less, and the second sheet being glass comprising a thickness of 300 microns or greater.

46. The article of claim 38, the modification layer comprises a coverage of from 10% to 100% of the bonding surface.

47. The article of claim 38, the modification layer comprises a coverage of from 20% to 90% of the bonding surface.

48. The article of claim 38, the modification layer comprises a coverage of from 50% to 90% of the bonding surface.

* * * * *

UNITED STATES PATENT AND TRADEMARK OFFICE
CERTIFICATE OF CORRECTION

PATENT NO. : 11,167,532 B2
APPLICATION NO. : 15/574560
DATED : November 9, 2021
INVENTOR(S) : Kaveh Adib et al.

It is certified that error appears in the above-identified patent and that said Letters Patent is hereby corrected as shown below:

On the Title Page

On page 5, in item (56), in Column 2, under "Other Publications", Line 53, delete "Cyloaddtion" and insert -- Cycloaddition --, therefor.

On page 6, in item (56), in Column 1, under "Other Publications", Line 21, delete "Writien" and insert -- Written --, therefor.

On page 6, in item (56), in Column 1, under "Other Publications", Line 24, delete "Writien" and insert -- Written --, therefor.

On page 6, in item (56), in Column 1, under "Other Publications", Line 27, delete "Writien" and insert -- Written --, therefor.

On page 6, in item (56), in Column 1, under "Other Publications", Line 30, delete "Writien" and insert -- Written --, therefor.

On page 6, in item (56), in Column 1, under "Other Publications", Line 34, delete "Aurthority" and insert -- Authority --, therefor.

On page 6, in item (56), in Column 2, under "Other Publications", Line 20, delete "Aurthority" and insert -- Authority --, therefor.

On page 6, in item (56), in Column 2, under "Other Publications", Line 29, delete "Irfrared" and insert -- Infrared --, therefor.

In the Claims

In Column 26, Line 34, in Claim 1, delete "methlydiphenylsilicon" and insert -- methyldiphenylsilicon --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*

In Column 27, Line 60, in Claim 17, delete "methlydiphenylsilicon" and insert -- methyldiphenylsilicon --, therefor.

In Column 28, Line 63, in Claim 29, delete "methlydiphenylsilicon" and insert -- methyldiphenylsilicon --, therefor.

In Column 30, Line 3, in Claim 40, delete "methlydiphenylsilicon" and insert -- methyldiphenylsilicon --, therefor.